(12) United States Patent
Kozbial et al.

(10) Patent No.: US 12,742,706 B2
(45) Date of Patent: Sep. 22, 2026

(54) METHOD FOR COLLECTING CELL TYPES

(71) Applicant: FLASKWORKS, LLC, Boston, MA (US)

(72) Inventors: Andrew Kozbial, East Boston, MA (US); Lekhana Bhandary, Boston, MA (US)

(73) Assignee: FLASKWORKS, LLC, Boston, MA (US)

( * ) Notice: Subject to any disclaimer, the term of this patent is extended or adjusted under 35 U.S.C. 154(b) by 452 days.

(21) Appl. No.: 18/540,020

(22) Filed: Dec. 14, 2023

(65) Prior Publication Data

US 2024/0201051 A1 Jun. 20, 2024

Related U.S. Application Data

(60) Provisional application No. 63/433,265, filed on Dec. 16, 2022.

(51) Int. Cl.
*G01N 1/18* (2006.01)

(52) U.S. Cl.
CPC .................................... *G01N 1/18* (2013.01)

(58) Field of Classification Search
None
See application file for complete search history.

(56) References Cited

U.S. PATENT DOCUMENTS

| | | | |
|---|---|---|---|
| 6,354,986 B1 * | 3/2002 | Hlavinka ............ | A61M 1/3693 494/45 |
| 2007/0144978 A1 | 6/2007 | Antwiler et al. | |
| 2022/0169972 A1 | 6/2022 | Murthy | |

(Continued)

FOREIGN PATENT DOCUMENTS

| | | |
|---|---|---|
| WO | 2018/204992 A1 | 11/2018 |
| WO | 2019/140491 A1 | 7/2019 |
| WO | 2021252898 A1 | 12/2021 |

OTHER PUBLICATIONS

International Search Report and Written Opinion issued in International Application No. PCT/US2023/084027, date of mailing: Mar. 15, 2024, 9 pages.

(Continued)

*Primary Examiner* — Jennifer Wecker
*Assistant Examiner* — Tracy Ching-Tian Colena
(74) *Attorney, Agent, or Firm* — Brown Rudnick LLP; Adam M. Schoen

(57) ABSTRACT

The present invention provides methods for collecting desired cells from a sample using counterflow centrifugal elutriation. Methods of the invention provide for a continuous elutriation workflow with optimized conditions that improves cell purity and retention during the elutriation process. Specifically, methods of the invention use a continuous counterflow centrifugal elutriation process that does not require harvesting cells or removing cells from the separation chamber between elutriation cycles. Methods of the invention increase the purity of desired cell populations, cell number yield, cell recovery, and cell viability to improve downstream processing. Methods of the invention also reduce the volume of buffers and reagents necessary for processing and speeds up the elutriation process for a cost-effective and more efficient cell manufacturing workflow.

18 Claims, 16 Drawing Sheets

(56) References Cited

U.S. PATENT DOCUMENTS

| | | | |
|---|---|---|---|
| 2022/0235305 | A1 | 7/2022 | Murthy et al. |
| 2022/0306977 | A1 | 9/2022 | Murthy et al. |

OTHER PUBLICATIONS

Li, 2021, Advances in automated cell washing and concentration, Cytotherapy, 23:774-786.

Ohta, 2017, A review of macroscale and microscale cell lysis methods, Micromachines, 8(3):83, 1-27.

Schwartz, 2014, Optimizing cell separation with Beckman Coulter's centrifugal elutriation system, Beckman Coulter Centrifugation Life Sciences Application Notes, 6 pages.

* cited by examiner

METHOD FOR COLLECTING CELL TYPES

CROSS-REFERENCE TO RELATED APPLICATIONS

This application claims priority to, and the benefit of, U.S. Provisional Application No. 63/433,265, filed Dec. 16, 2022, the content of which is incorporated by reference herein in its entirety.

TECHNICAL FIELD

The present invention relates generally to methods of separating cells for downstream processing in a cell manufacturing workflow.

BACKGROUND

Cell and gene therapies developed using specially engineered cells, genes, and tissues, can be very useful. In particular, such cell and gene therapies can be used for personalized and precise therapies in preventing, diagnosing, treating and/or potentially curing diseases at their source.

Autologous and allogeneic cell and gene therapy workflows typically involve isolating cells from an individual, purifying and/or engineering those isolated cells, expanding and/or concentrating the isolated cells, and infusing such cells back into the patient. Autologous and allogeneic cell therapies are typically produced as small-scale operations. To ensure efficacy of the final product, it is imperative to have successful processing and manufacturing in the cell and gene therapy workflows.

Cell viability and purity of the cell population are critical issues in the manufacturing of cell therapy products. Reduced cell viability may result from prolonged time in transit, tissue digestion, cell manipulation, gene transduction, cryopreservation, and cell thawing. The minimal processing capacity and percentage of viable cells recovered are particularly important factors for autologous and allogeneic products because poor cell recovery may lead to a failed manufacturing run.

Manufacturing from apheresis material often requires cell selection and the initial step of removing red blood cells from a sample. Purity generally refers to the proportion of desired cells within a final isolated cell fraction (i.e., the greater the proportion of desired cells within a cell fraction, the greater the purity). As such, in order to obtain a cell fraction of adequate purity, the final isolated cell population should sufficiently represent the characteristics of the particular cell type of interest without the interfering effects of other cell types. Thus, optimization of the manufacturing process workflow is necessary to control cell viability and purity.

Counterflow centrifugation technology has been applied to the manufacturing process of cell therapy products, as it enables cell separation, cell washing, cell concentration, and subsequent cell selection. Counterflow centrifugal elutriation is a cell separation technique that separates cells predominantly according to their size, and, to some degree, according to their specific density, without a need for antibodies or ligands tagging cell surfaces. The principles of this technique have been well-known for many years, but have only recently been applied to cell separation technology.

Counterflow centrifugal elutriation can be used as a wash-and-concentrate step applied at the beginning of a manufacturing workflow for the purposes of cell enrichment. It can also be applied in the middle of the workflow for media change, or at the end of the process to concentrate the cell suspension for product formulation and filling.

However, a common challenge with counterflow centrifugal elutriation is the sensitivity of elutriation to cell types, media density, and processing temperature. As such, the overall process can be time-consuming and costly. For example, monocyte separation using counterflow centrifugal elutriation is achieved by a batch process in which cells are loaded, elutriated, washed, and harvested in a single batch. A new separation chamber must be used for each batch, or, in some instances, monocytes collected in the separation chamber are removed after each batch and before starting collection of a new batch. Furthermore, the elutriation settings must be optimized for each cell type or buffer, as either will influence the processing parameters. Thus, establishing optimal elutriation settings for processing rate and time for specific cell types is challenging. Cells subjected to stressors, such as transfection, transduction, enzyme digestion or cell selection, may become more sensitive by the stress induced by the separation process. Any negative impact on cell quality (e.g., shear stress) can be magnified downstream when cells are subjected to prolonged processing.

SUMMARY

The present invention provides methods for collecting cells from a sample using a novel continuous counterflow centrifugal elutriation process. Specifically, methods of the invention use a continuous counterflow centrifugal elutriation process that does not require batch processing, i.e. harvesting of cells or removing cells from the separation chamber between elutriation cycles. In contrast to previous methods, the continuous elutriation methods of the invention allow for multiple elutriation cycles where cells are continually loaded, such that cells are harvested only once in the workflow. Thus, the methods of the invention do not require harvesting the cells from the separation chamber, replacing the separation chamber, or scraping the fluidized bed in the separation chamber between elutriation cycles and addition of subsequent cell loads. Continuous elutriation methods of the invention increase the purity of resulting cell populations, cell number yield, cell recovery, and cell viability to improve downstream processing. Methods of the invention also reduce the volume of buffers and reagents necessary for processing, and speed up the elutriation process for a cost-effective and more efficient workflow for cell manufacturing.

Methods of the invention are designed to use commercially available counterflow centrifugation (CFC) systems for processing leukapheresis, cell concentration, and cell suspension. The methods provide for using CFC devices to process donor or patient leukapheresis, or other samples containing cell products. For example, methods of the invention acquire enriched monocytes for downstream processing. Methods of the invention may also be used as a separation step applied in a manufacturing workflow for the purposes of cell enrichment. For example, the methods also provide for concentration and suspension of dendritic cells in downstream processing.

Methods of the invention provide for an improved workflow for autologous and allogeneic cell manufacturing that reduces costs and decreases the time necessary for processing, while also improving overall recovery of viable cells. Specifically, the invention optimizes the parameters of the elutriation cycle, for each individual cycle, such that there is a minimal loss of desired cells before new cells are loaded into the device. For example, the parameters of each elutriation cycle may be optimized such that there is minimal loss of cells of interest, such as monocytes before new cells are loaded into the device. In some cases no cells of interest are removed before new cells are loaded into the device.

Multiple, with a minimum of two, elutriation cycles may be performed as cells are continuously loaded into the separation chamber. Thus, the cells are continually collected in a fluidized bed of the separation chamber to form an aggregate of cells from the cell loads. Specifically, the methods do not require harvesting the cells, replacing the separation chamber, removing the fluidized bed from the surface of the separation chamber, either physically by way of scraping or the like, or via enzymatic methods, such as trypsin-based methods, (i.e., removing cells from the surface of the separation chamber), or removing the fluidized bed from the separation chamber between elutriation cycles and addition of subsequent cell loads.

The parameters optimized include the rotation speed of the separation chamber, the cell load volume, the cell load flow rate, and the time for fluidized bed formation. Thus, the cells may be continuously loaded into the chamber for a continuous elutriation process. The continuous elutriation process of the invention significantly decreases the workflow time while significantly increasing the recovery of cells such as monocytes.

Aspects of the invention provide a method of collecting cells of interest. In the method, a first cell load is introduced into a rotatable separation chamber of a reverse flow, or counterflow, centrifugation device. The first load of cells contains a first set of cells of interest and a first set of other cell types. A first elutriation cycle is performed on the first cell load to form a fluidized bed of cells of interest within the separation chamber such that the first set of cell types are separated from the first set of cells of interest. Significantly, the first set of cells of interest collected in the fluidized bed are not removed from the separation chamber. Instead, the method provides for introducing a second cell load into the separation chamber while the first set of cells of interest remains within the fluidized bed in the separation chamber. The second cell load includes a second set of cells of interest and a second set of one or more other cell types. The method includes performing a second elutriation cycle on the second cell load to collect the second set of cells of interest on the fluidized bed of the first set of cells of interest in the separation chamber while the second set of one or more other cell types are separated apart from the first and second sets of cells of interest.

Methods of the invention are applicable for collecting any cell type. In certain embodiments, the invention provides a method of collecting monocytes. In the method, a first cell load is introduced into a rotatable separation chamber of a reverse flow, or counterflow, centrifugation device. The first load of cells contains a first set of monocytes and a first set of other cell types. A first elutriation cycle is performed on the first cell load to form a fluidized bed of monocytes within the separation chamber such that the first set of cell types are separated from the first set of monocytes. Significantly, the first set of monocytes collected in the fluidized bed are not removed from the separation chamber. Instead, the method provides for introducing a second cell load into the separation chamber while the first set of monocytes remains within the fluidized bed in the separation chamber. The second cell load includes a second set of monocytes and a second set of one or more other cell types. The method includes performing a second elutriation cycle on the second cell load to collect the second set of monocytes on the fluidized bed of the first set of monocytes in the separation chamber while the second set of one or more other cell types are separated apart from the first and second sets of monocytes.

Thus, the first elutriation cycle and the second elutriation cycle are performed as a continuous elutriation process. In some embodiments, the addition of cell loads and subsequent elutriation cycles may be repeated any number of times to collect the cells, such as monocytes, in the separation chamber as an aggregate of the total cell loads introduced and elutriation cycles performed.

In some embodiments, the methods include tuning one or more parameters of the elutriation cycle or cycles. Tuning the one or more parameters optimizes the formation of the fluidized bed of cells, such as monocytes, and/or the collection of cells, such as monocytes, on the fluidized bed within the separation chamber. The parameter(s) may be the rotation speed of the separation chamber, the cell load volume, the cell load flow rate, and the time for fluidized bed formation.

In some embodiments, the parameter(s) of the first elutriation cycle are tuned to optimize the formation of the fluidized bed of the first set of cells of interest within the separation chamber. The parameter(s) of the second elutriation cycle may be tuned to optimize the collection of the second set of cells of interest on the fluidized bed of the first set of cells of interest in the separation chamber. In still other embodiments, the parameter(s) of the second elutriation cycle are tuned so as to maintain the fluidized bed of the first set of cells of interest within a first portion of the separation chamber while further collecting the second set of cells of interest on the fluidized bed.

For example, the rotation speed of the separation chamber may be adjusted from a first rotation speed associated with performing the first elutriation cycle to a second rotation speed associated with performing the second elutriation cycle that is different than the first rotation speed. Thus, in some embodiments, the second rotation speed results in movement of the fluidized bed of the first set of cells of interest to the first portion of the separation chamber such that space in the separation chamber is available for collecting the second set of cells of interest on the fluidized bed.

In some embodiments, methods of the invention further include performing a final elutriation cycle. The elutriation cycle may be performed without prior introduction of an associated cell load into the separation chamber.

In some embodiments, the first cell load and the second cell loads may be introduced into the separation chamber with an associated fluid. For example, the first cell load and the second cell load are suspended within a buffer solution.

In preferred embodiments, the cells are obtained from a leukapheresis process.

In some embodiments, the method further comprises washing an aggregate of cells of interest collected within the separation chamber upon completion of all elutriation cycles.

DETAILED DESCRIPTION

The present invention provides novel methods for collecting cell types using continuous counterflow centrifugal elutriation. Manufacturing cell and gene therapies poses a number of challenges, such as working with inconsistent starting material due to variable cell populations, and poor efficacy in cell processing. Methods of the invention provide for workflows that result in higher cell separation purity and recovery while reducing the amount of time necessary for cell processing.

Methods of the invention are designed to use commercially available counterflow centrifugation (CFC) systems for processing apheresis, cell concentration, and cell suspension. Methods of the invention may also be used as a separation step applied in a manufacturing workflow for the purposes of cell enrichment.

Unlike prior art methods, methods of the invention use a continuous counterflow centrifugal elutriation process that does not require harvesting cells or removing cells from the separation chamber between elutriation cycles. Specifically, the methods do not require harvesting the cells, replacing the separation chamber, scraping the fluidized bed (i.e., removing cells from the surface of the separation chamber), or removing the fluidized bed from the separation chamber between elutriation cycles and addition of subsequent cell loads. Further, methods of the invention do not require enzymatic removal or trypsin-based removal procedures.

The methods improve cell purity and retention during the elutriation process. Thus, the invention provides for increased purity of separated cell populations, cell number yield, cell recovery, and cell viability to improve downstream processing.

Counterflow Centrifugal Elutriation

Counterflow centrifugation technology dates back to the 1970s and has been widely used in cell processing. Elutriation is the process of separating particles based on their size, shape and density, using a stream of gas or liquid flowing in a direction usually opposite to the direction of sedimentation. The smaller or lighter particles rise to the top (overflow) because their terminal sedimentation velocities are lower than the velocity of the rising fluid. Thus, counterflow centrifugation achieves cell concentration and separation by balancing centrifugal force with a counterflow force.

Figure 1:
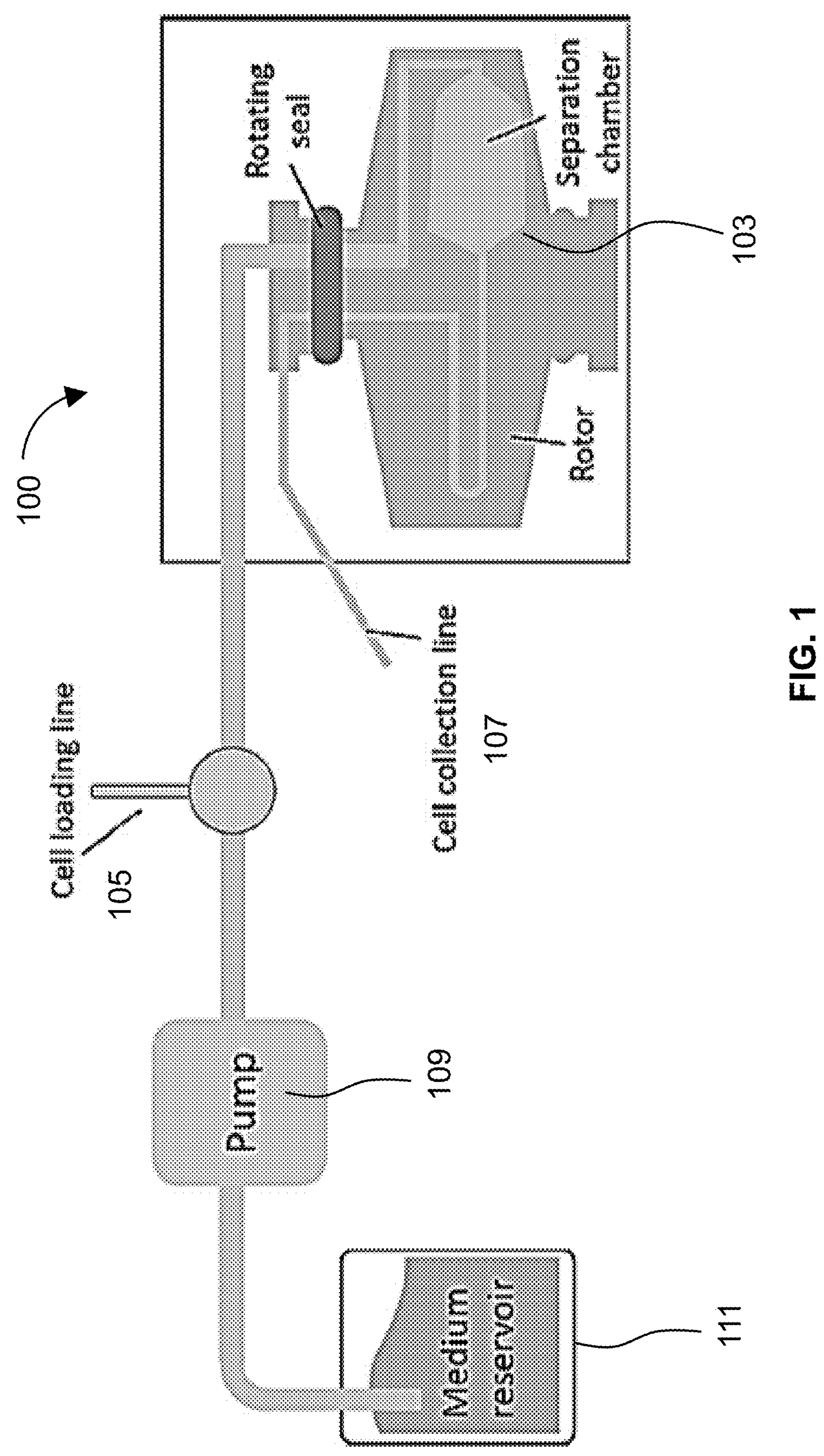
FIG. 1 illustrates one embodiment of a counterflow, or reverse flow, centrifugation device.

FIG. 1 illustrates a general embodiment of a counterflow, or reverse flow, centrifugation device 100. Medium is pumped from the medium reservoir 111 into the separation chamber 103. Cells are introduced through the cell loading line 105 into the rotating chamber and are then separated in the chamber according to size and density. Different fractions of cells are collected from the collecting tube or line 107 by increasing pump flow rate. Devices generally include a pump 109 and medium reservoir 111.

FIG. 2 illustrates different embodiments of counterflow centrifugation separation chambers 200. Typically, a counterflow centrifugation separation chamber 200 is cone-shaped, funnel-shaped, or triangle-shaped. The cells may arrive in the narrower end 201 of the chamber 200 and travel toward the wider end 203. During counterflow centrifugation, a counterflow velocity gradient is created across the chamber and is highest at the narrow end of the chamber and lowest at the widest part of the chamber.

Figures 2A, 2B:
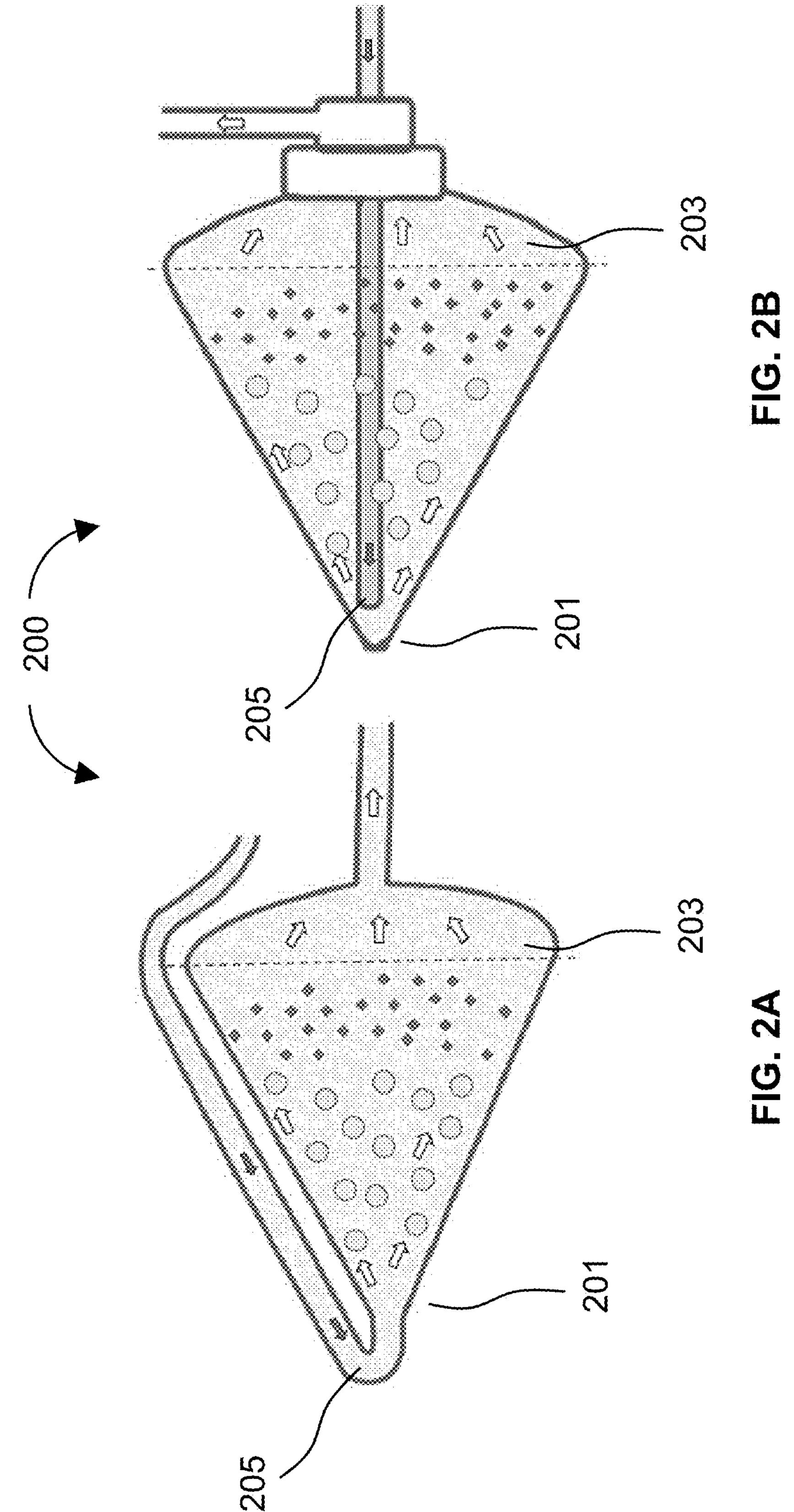
FIG. 2A is an illustration of one embodiment of a counterflow centrifugation separation chamber in which the inlet is outside the separation chamber itself.
FIG. 2B is an illustration of one embodiment of a counterflow centrifugation separation chamber in which the inlet is contained within the separation chamber itself.

The cell inlet 205 may be exterior to the chamber as shown in FIG. 2A, or may be within the chamber as shown in FIG. 2B. For example, cell separation chambers are described in Li, 2021, Advances in automated cell washing and concentration, Cytotherapy, 000:1-13 incorporated by reference herein. Methods of the invention are not limited to any certain type of reverse flow centrifugation device or separation chamber design.

The elutriation rotor is designed to separate and/or concentrate monodisperse suspensions of single cells or particles according to size. The particles may be in the range of approximately 2 to 50 μm in diameter. The elutriation rotor combines two separation technologies such that each cell in the chamber is acted upon by the two opposing forces of centrifugal force and fluid velocity. Centrifugal force drives the cell away from the axis of rotation (sedimentation), whereas fluid velocity drives the cell toward the axis of rotation (counterflow elutriation).

Typically, a cell suspension enters the chamber from the narrow end of the chamber under a constant flow rate while being subjected to a centrifugal force. The flow of the fluid is exerted in the opposite direction to the centrifugal force. This counterflow force forms a gradient within the cell chamber. The counterflow force then decreases as the cell chamber widens away from the tip of the cone-shaped cell chamber. Thus, in counterflow centrifugation the settling rate of particles in a fluid under centrifugal acceleration is counteracted by a flow of the supporting media. Counterflow centrifugation retains cells in a fluidized bed or suspension by balancing the sedimentation velocity with the counterflow velocity in the processing chamber.

The relationship between the centrifugal and counterflow velocities of the particles can be expressed as a ratio, i.e., the counterflow centrifugal force to flow rate (C:F) ratio. The elutriation process is generally facilitated by a low C:F ratio, which allows expansion of the fluidized cell bed, thereby pushing the smaller cells toward the wider end of the chamber. Cells with higher density and larger diameter have a higher sedimentation rate, and thus they reach force equilibrium towards the tip of the cone-shaped chamber.

As described in Schwartz, 2014, Optimizing cell separation with Beckman Coulter's centrifugal elutriation system, Beckman Coulter Centrifugation Application Notes, CENT-519APP09.14-A:44-49, incorporated by reference herein, many variables determine the sedimentation of cells under a centrifugal force and flow rate inside an elutriation chamber. For example, the forces may include the g-force provided by the centrifuge; the counterflow velocity; the diameter of cells in solution; the densities of both the cells and the elutriation buffer; and the cross-sectional area of the chamber. The fluid dynamics within a counterflow centrifugation chamber may be modeled using Stokes' Law, which explains the relationship between the variable:

$$SV = \left[\frac{d^2(\rho_p - \rho_m)}{18\eta}\right]\omega^2 r$$

Where, SV=sedimentation velocity; d is the diameter of the particle; $\rho_p$ is the density of the particle; $\rho_m$ is the density of the buffer; $\eta$ is the viscosity of the buffer; r is the radial position of the particle; and $\omega$ is the angular velocity in radians/second. The sedimentation velocity (SV) increases with increasing diameter of the particle (d), density difference between particles and buffer ($\rho_p$-$\rho_m$), centrifugal angular velocity ($\omega$) and radial position of the particles (r).

The counterflow velocity is modeled using the below:

$$CV = \frac{F}{A}$$

The counterflow velocity (CV) in the direction opposite to the sedimentation velocity is a ratio of flow rate (F) to cross-sectional area (A).

Cells within the chamber reach velocity equilibrium when the sedimentation velocity is equal to the counterflow velocity.

Further, Deriving Stokes' Law with normal cellular run conditions (assuming that $\rho_p$-$\rho_m$=0.05 g/mL, $\eta$=1.002 mPa/s), a relationship between flow rate F, cell diameter d, and centrifugal speed (RPM) can be expressed as:

$$F = Xd^2\left(\frac{RPM}{1000}\right)^2$$

where, F=flow rate and X is a constant reflective of the geometry of the chamber. Using this equation allows for determining flow rate and speed combinations at which cells of a given size will either be retained or swept out of the chamber.

Figure 3:
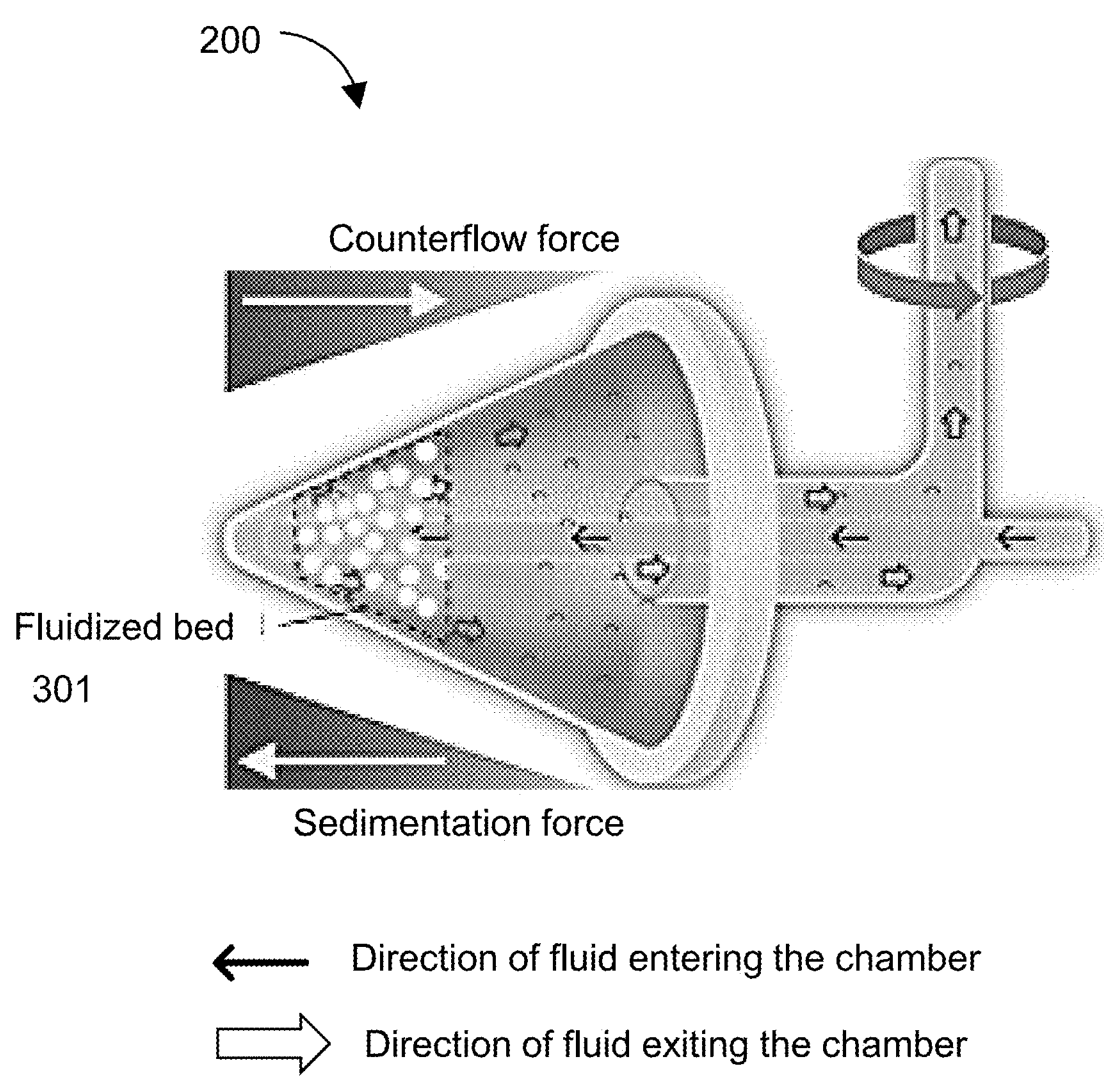
FIG. 3 illustrates separation taking place within the cone- or funnel- or triangle-shaped elutriation chamber such that the fluidized bed of cells is formed near the narrow end of the chamber, and also illustrating the direction of counterflow forces and sedimentation forces exerted on the cells within the chamber.

FIG. 3 illustrates that separation takes place in the cone- or funnel-shaped elutriation chamber 200. Counterflow centrifugation allows cells to travel from the narrow end 201 of the chamber toward the wider end 203 against the forces of sedimentation velocity such that cells accumulate and form a fluidized bed 301. Cells or particles of smaller size and lower density migrate towards the wider end of the chamber and can be separated from the larger or denser cells or particles through elutriation.

The counterflow force is present in a gradient within the cell chamber 200. While centrifuging (grey arrow), cell debris and small particles that are too small to remain in the chamber are washed away. While the rotor is spinning in the centrifuge, a suspension of cells is pumped at a preset flow rate from outside the centrifuge into the rotor to the narrow end of the elutriation chamber. As suspended cells are introduced into the chamber, they migrate according to their sedimentation rates to positions in the gradient where the effects of the two forces upon them are balanced. Larger cells with higher sedimentation velocity will accumulate in the region of the chamber where the highest counterflow velocity is encountered (i.e., at the narrower end of the chamber). These cells receive a higher sedimentation force, in which the cells reach force equilibrium towards the narrow end of the chamber, forming a fluidized cell bed 301. The cells are suspended in a fluidized bed 301 by the exertion of a constant flow force opposite the centrifugal force.

Small cells with lower sedimentation rates are washed toward the axis of rotation where they accumulate at the wider end of the chamber where counterflow velocity is lowest. Once equilibrium is achieved within the chamber, the application of a higher flow rate will force smaller cells out of velocity equilibrium (i.e., elutriation). These cells are washed out of the chamber, up through the rotor, and out into a collection vessel. Somewhat larger or denser cells move through the chamber more slowly and reach equilibrium at the elutriation boundary. The largest or densest cells remain near the inlet to the chamber where centrifugal force and fluid velocity are high.

By increasing the flow rate in gradual steps, successive fractions of increasingly large or dense cells can be washed out of the rotor and collected. Continued incremental increase of the flow rate will finally elutriate all cells from the chamber. Cell types of different sizes can be separated by tuning centrifugal speed and flow rate to create an imbalance of forces.

Batch Elutriation Protocol

Figure 4:
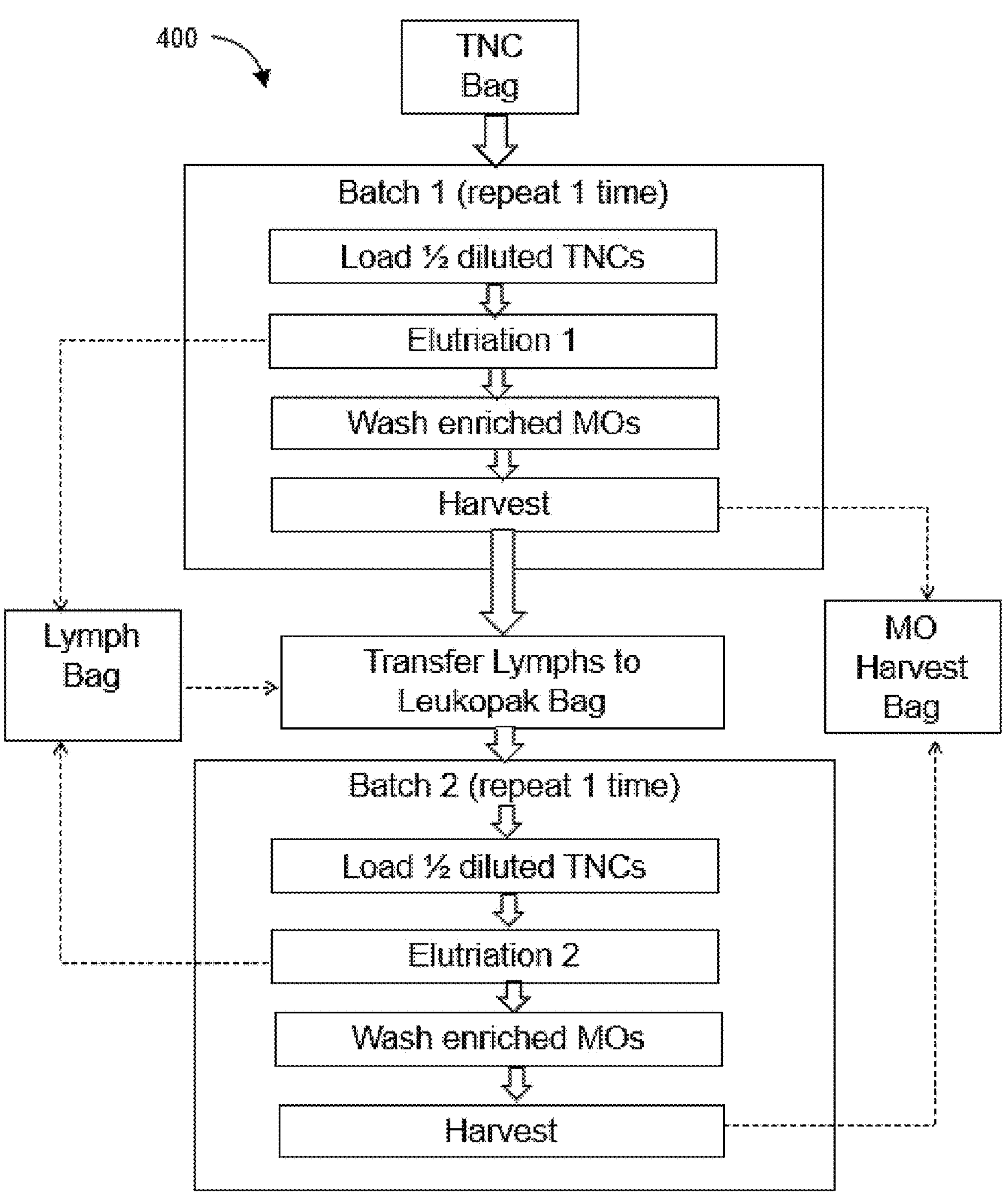
FIG. 4 is a block diagram of collecting monocytes using the historical batch processing approach in which monocytes are harvested after each elutriation cycle before another batch of cells are added to the separation chamber.

FIG. 4 illustrates a prior art approach to the standard batch elutriation protocol 400 for cell separation, collection, and enrichment. Specifically, cell elutriation using counterflow centrifugal elutriation is achieved using batch elutriation 400 wherein cells are exposed to one cycle of elutriation, washed, and then harvested. The chamber is configured as a single-use separation chamber, each batch equating to one elutriation cycle. Thus, harvesting cells from the separation chamber takes place before beginning a new elutriation cycle. Because of the sensitivity of cells to the hydrodynamic forces of counterflow centrifugation, batch elutriation was previously thought necessary to prevent damage to cells and cell loss.

Cells are typically elutriated into multiple fractions for the batch. The operator then decides to keep or discard fractions based on the yield and purity of each fraction. The overall process can be time-consuming, especially if only two cell fractions are required. To separate cell fractions, the pumping rate is increased in a stepwise manner in order to elute the various fractions of cells. Importantly, unlike the methods of the invention, only one batch of separated cells are obtained from each elutriation cycle.

The workflow includes concentrating a cell population in the input fluid. In the first phase of the process, the rotating chamber and surrounding fluid lines are flooded with priming fluid. The chamber is set spinning around the axis to create the centrifugal acceleration. The input fluid containing the cells is then pumped through the chamber. The speed of the pumped flow rate is selected so a fluidized bed of the cells forms as they enter the separation chamber. The fluid can be the original cell suspension fluid used for initial loading, thereby continuing to introduce cells into the chamber. The centrifugal acceleration causes the cells to settle towards the outer end of the chamber. By adding the fluid flow in the opposite direction to the direction of settling, the cells can be held suspended. The conical or funnel shape of the chamber allows the local fluid velocity to be aligned to the centrifugal acceleration at each radius to create a working zone. With the correct flow rate, fluid media and centrifuge speed, cells accumulate and form a stable fluidized bed. Cells entering this zone will form and join the fluidized bed. As the cells are introduced to the chamber by the counter fluid flow, these cells are effectively deposited at the fully settled point as they enter the chamber by the combined action of the fluid flow and centrifugal acceleration. In some cases large or dense cells can form a pseudo pellet at the tip of the cone due to the high-speed processing, which can become a problem during high-speed processing.

The outlet allows the clarified fluid to leave the chamber. The clarified fluid exiting the chamber is then returned to a supply bag and recirculated to enable the fluidized bed to establish and accumulate. Thus, in each batch, culture media may be recirculated from the chamber back to the cell transfer bag to allow for the fluidized bed to form and to stabilize prior to volume reduction and buffer exchange. Once the bed is established the outlet flow from the chamber can be directed to a waste bag until the cell suspension from the input bag has been drawn in. Once the fluid suspension has been drawn in, the fluid path can be re-configured by changing valves and pump configurations to proceed with the next step.

Figure 5:
FIG. 5 is a block diagram illustrating an overview of the historical batch processing method in which cells are captured and accumulate as a fluidized bed upon counterflow centrifugation and then removed from the separation chamber after one elutriation cycle.
Figure 5:
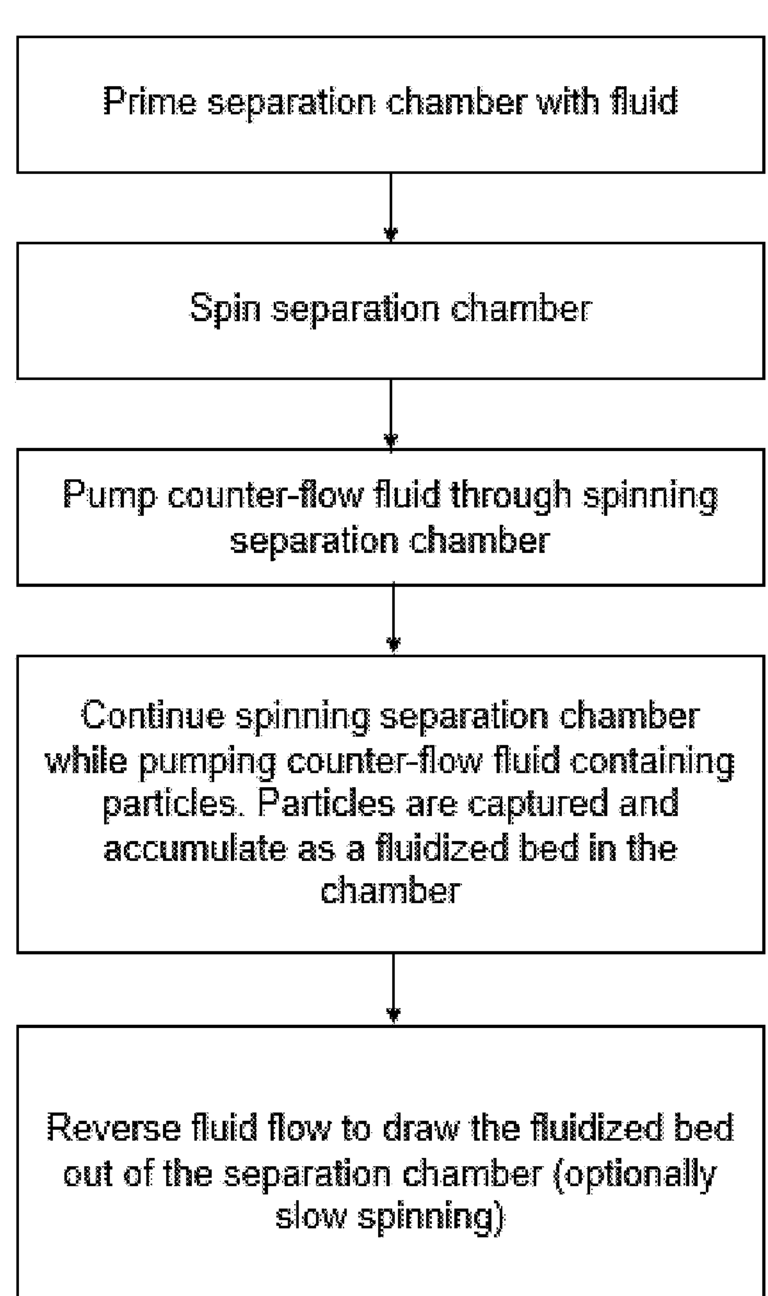

FIG. 5 illustrates a block diagram of a broad overview of a prior art approach to a batch elutriation protocol 400. Once the cells have accumulated in the fluidized bed, a wash and recovery step is used to retrieve the cells as a concentrate. The flow is reversed and the fluidized cell bed moves toward the tip of the cone and is drawn out of the cone, for example via the same fluid channel that was used for fluid input. The reverse fluid flow draws the fluidized bed out of the separation chamber. Cells may remain in the separation chamber and may be lost or require manual removal. Again, in a batch elutriation protocol, the cell separation chamber is configured for use with one elutriation batch.

As noted above, reverse flow centrifugation can also be used to isolate different cell populations by virtue of their response to the conditions in the chamber. Increasing the reverse flow rate where a fluidized bed has been formed will result initially in the bed expanding, more intercellular space between each cell, and the bed expanding up the cone. Some cells that may be smaller or have "rougher" external morphology may have a different settling velocity resulting in the cells being unstable in the fluidized bed and being driven out of the cone-inwards.

The rate of "harvesting" as the collection step is governed by the fluid flow rate that the fluidized bed can tolerate without loss of cells from the fluidized bed. Cell loss typically increases with increasing flow rate due to the increasing instability of the fluidized bed at higher flow rates. The cells are washed and harvested before another batch of cells is processed. This involves cleaning or scraping the separation chamber (i.e. removing cells from the surface) or using a different separation chamber.

For processing smaller cells, the number of cells required to achieve a stable fluidized cell bed is approximately $3\times10^7$ cells, depending on the CFC chamber size. When the cell number is too low, cells are more likely to be removed from the fluidized bed, which affects the final cell recovery. If the cell concentration is low (e.g., below $0.2\times10^6$/mL), the recirculation step may need to be extended to allow enough cells to form the fluidized cell bed, thus adding to overall workflow time and exposing cells to hydrodynamic stress. Current batch elutriation protocols allow for processing only a small volume of media, and processing time is significantly extended for larger volumes. The impact of extended processing time on cell quality must also be taken into account. Thus, the necessity of maintaining the density gradient within the separation chamber means that in order to scale up production, larger chambers, not continuous throughput, are required. This is problematic because as the size of the device increases so do the physical forces acting on the cell during introduction into the chamber, risking damage to sensitive cell products. When cells are damaged or destroyed, they do not function properly and can negatively affect the results of a downstream assay.

Continuous Elutriation Using Counterflow Centrifugation

The invention provides methods of collecting cells using a novel continuous elutriation process wherein multiple elutriation cycles are performed on a continuous flow of cells before harvesting the cells. Methods of the invention optimize conditions and parameters for each elutriation cycle such that cells are maintained in the fluidized bed and new cells are added to the fluidized bed. Thus, the methods do not require harvesting the cells, replacing the separation chamber, scraping the fluidized bed (i.e., removing cells from the surface), or removing the fluidized bed from the separation chamber between elutriation cycles and addition of subsequent cell loads. Further, methods of the invention do not require enzymatic removal or trypsin-based removal procedures.

As described in detail in the examples below, the methods of the invention provide for increased purity of cells collected, reduced processing time, reduced buffer use, and improved cell viability for downstream processing.

Cell number yield is the number of desired cells that are successfully isolated after cell separation. Cell recovery describes the percent of cells that were isolated from the total number of target cells. This may be calculated by dividing the cell yield by the total number of cells and multiplying by 100. Cell sample purity refers to the ratio of isolated cells of interest to undesired cell types. This value is typically represented as a percentage equal to the desired cells out of the total number of isolated cells. For example, if the purity of a sample is 80%, then 80 out of 100 cells are the cell type of interest, while the remaining 20 are undesired cell types. Cell viability refers to the amount of healthy, living cells that survive the separation process. Viability is calculated by staining dead or damaged cells and subtracting the number of stained cells from the total sample, then calculating the percentage of healthy cells out of the total.

The methods of the invention may be used for processing, collection, concentration, and cell suspension of any type of cell, for example red blood cells, granulocytes (neutrophils, eosinophils, and basophils), monocytes, lymphocytes, macrophages, and the like. For example, aspects of the invention provide a method for collecting cells that includes introducing a first cell load into a rotatable separation chamber of a reverse flow centrifugation device, wherein the first cell load comprises a first set of cells of interest and a first set of one or more other cell types; performing a first elutriation cycle on the first cell load to form a fluidized bed of the first set of cells of interest within the separation chamber while the first set of one or more other cell types are separated apart from the first set of cells of interest; introducing into the separation chamber a second cell load while the first set of cells of interest remains within the separation chamber, wherein the second cell load comprises a second set of cells of interest and a second set of one or more other cell types; and performing a second elutriation cycle on the second cell load to collect the second set of cells of interest on the fluidized bed of the first set of cells of interest in the separation chamber while the second set of one or more other cell types are separated apart from the first and second sets of cells of interest.

Figure 6:
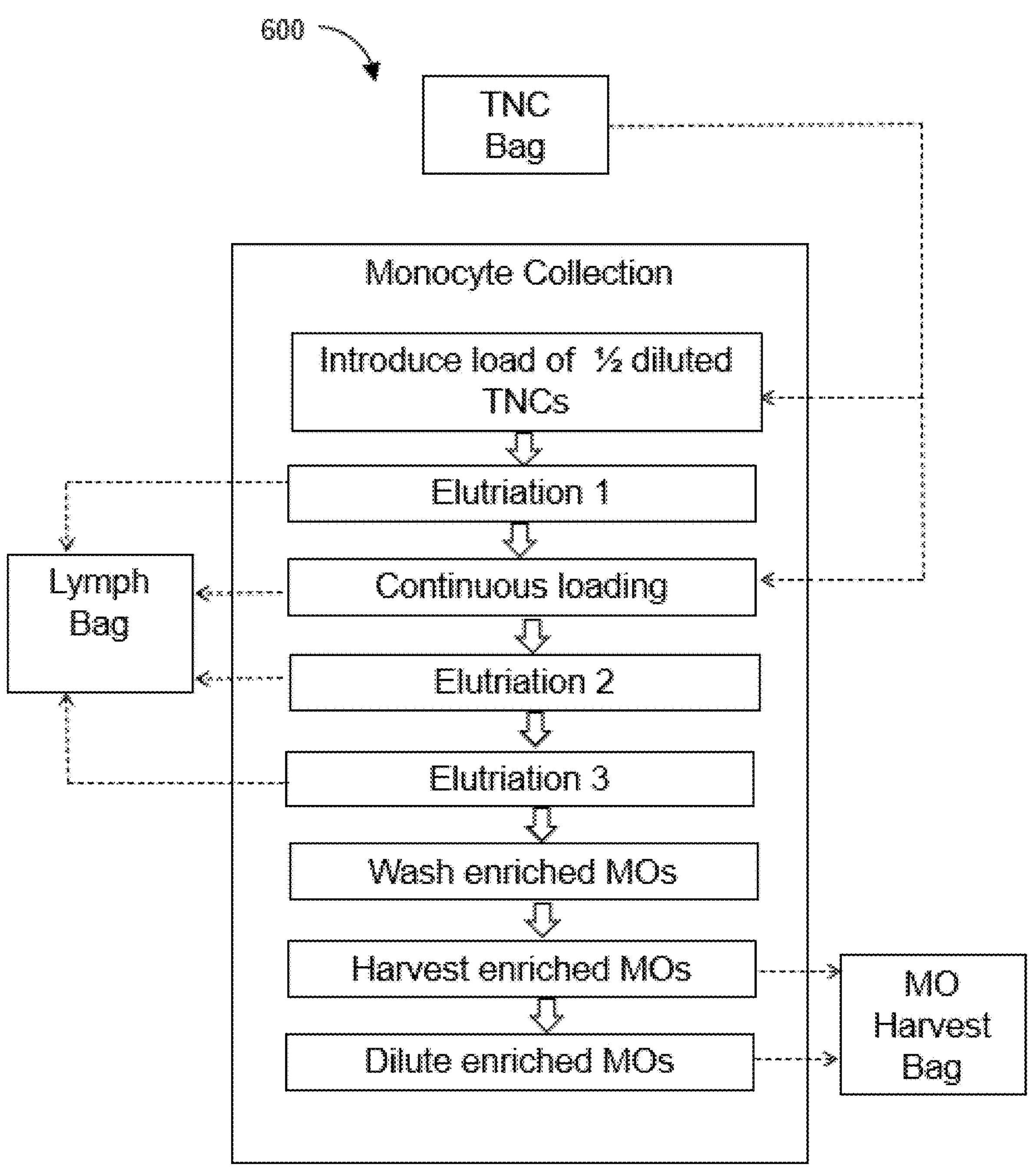
FIG. 6 is a block diagram illustrating an embodiment of a workflow for monocyte collection of the present invention in which monocyte collection is achieved using continuous elutriation without removing the fluidized bed from the chamber after each elutriation cycle.

FIG. 6 is a block diagram of a method of collecting monocytes 600 using continuous elutriation in one embodiment of the invention. In this specific aspect, the invention provides a method for collecting monocytes 600.

The method includes introducing a first cell load into a rotatable separation chamber of a reverse flow centrifugation device. The reverse flow, or counterflow, centrifugation device may be any commercially available device such as the Gibco CTS Rotea Counterflow Centrifugation System from ThermoFisher Scientific, the Korus™ elutriation system from Inventech, the Beckman Coulter Elutriator, or the Elutra® Cell Separation System manufactured by Terumo.

The size of the separation chamber of the available devices may dictate the maximal and minimal processing capacity for achieving a stable fluidized cell bed. As noted above, the formation of a fluidized bed requires a critical number of cells within the chamber, where collisions of cells minimize the whirling effect caused by incoming cells.

Methods of the invention may use any chamber design. For example, some chambers have a cell inlet external to the chamber and connected from the narrow end. The Rotea chamber design differs in that the cell inlet is inside the chamber which may allow for a higher centrifugal speed and minimized dead space. Higher centrifugal speed allows cells to accumulate in the chamber at a higher flow rate. Methods of the invention adjust parameters to allow for continuous elutriation based on the reverse flow centrifugation device used as well as the design of the separation chamber to optimize the collection of an aggregate of cells in the fluidized bed from a number of elutriation cycles.

The separation chamber may place the conical fluid enclosure at a small radius relative to the center (axis) of rotation. This design minimizes the kinetic energy in the rotating system relative to the centrifugal acceleration. Kinetic energy increases with the square of the radius and the square of the speed of rotation. The acceleration increases with the square of the speed of rotation but is linearly proportional to radius of rotation. This principle may be applied to the design of the separation chamber to keep the kinetic energy at a low and safe level for the cells, for example, less than 20 joules at 5800 rpm. The design of the separation chamber is taken into account when tuning parameters to optimize the formation of the fluidized bed for each elutriation cycle.

The cell load may be, for example, blood samples collected through leukapheresis from a donor or patient. The cell load may be introduced from a bag containing total nucleated cells (TNCs). For example, total nucleated cell (TNC) products are often collected by leukapheresis.

The cell load may be a mixture of cells from a leukapheresis product from a donor or patient. For example, the starting material may be a fresh or frozen product derived from leukapheresis. The leukapheresis product is composed of a variety of blood cells including monocytes, lymphocytes, platelets, plasma, and red cells. In some embodiments of methods of the invention, the first cell load includes a first set of monocytes and a first set of other cell types. It is noted that these examples are non-limiting. The continuous counterflow centrifugation elutriation methods of the invention may be used for any sample containing cells or cell products.

Methods of the invention may use a buffer for washing, diluting, transporting, or for reagent preparation. For example, methods of the invention may use Dulbecco's phosphate-buffered saline (DPBS). DPBS is a balanced salt solution used for a variety of cell culture applications, such as washing cells before dissociation, transporting cells or tissue samples, diluting cells for counting, and preparing reagents. Methods of the invention may use DPBS in pre-processing steps, to dilute TNCs, as a carrier fluid for cell loading, or for washing, concentrating and/or harvesting cells after the continuous elutriation process is complete. In some embodiments, TNCs may be washed, such as with DPBS supplemented with human serum and EDTA. Importantly, methods of the invention minimize the amount of DPBS buffer required for the workflow as compared to current protocols, thus providing a more cost-effective protocol.

Methods of the invention include performing a first elutriation cycle on the first cell load to form the fluidized bed of a first set of cells of interest, for example monocytes, within the separation chamber. The other cell types are eluted out of the separation chamber during the first elutriation cycle. Importantly, cells may be continuously loaded into the separation chamber for the second elutriation cycle. In some embodiments, a second cell load is introduced into the same separation chamber. The second cell load may also contain a second set of cells of interest, for example, monocytes, and other cell types. Thus, a second elutriation cycle is performed such that the second set of cells of interest is collected in the fluidized bed containing the first set of cells of interest to form an aggregate of cells of interest from the total number of cell loads and elutriation cycles.

In some embodiments, lymphocytes contained within the cell load leave the separation chamber during elutriation and are directed to a lymphocyte bag for collection, while cells of interest, such as monocytes, remain within the separation chamber in the fluidized bed. Each elutriation cycle may separate lymphocytes from the cell load and direct the lymphocytes to the lymphocyte bag.

In some embodiments methods of the invention include two elutriation cycles. In other embodiments, methods of the invention include three or more elutriation cycles. The final elutriation cycle may or may not include introducing another cell load to the separation chamber. Importantly, methods of the invention provide for cell separation via a continuous elutriation process that does not require harvesting cells between elutriation cycles, replacing the separation chamber, or scraping the fluidized bed (i.e., removing cells from the surface of the separation chamber), or removing the fluidized bed from the separation chamber between elutriation cycles and addition of subsequent cell loads. This is achieved by carefully tuning one or more parameters of the elutriation cycle(s) to optimize the formation of the fluidized bed of cells and/or the collection of the desired cells i.e., cells of interest, on the fluidized bed in the separation chamber. Thus, the fluidized bed may be an aggregate of desired cells from one or more loads of cells introduced into the separation chamber and one or more elutriation cycles performed on the cells.

In some embodiments, methods of the invention include tuning one or more parameters of at least one of the elutriation cycles to optimize the formation of the fluidized bed of cells of interest and/or the collection of cells of interest on the fluidized bed within the separation chamber.

As noted above, many variables determine the sedimentation of cells under a centrifugal force and flow rate inside an elutriation chamber. For example, the forces may include the g-force provided by the centrifuge; the counterflow velocity; the diameter of cells in solution; the densities of both the cells and the elutriation buffer; and the cross-sectional area of the chamber. Methods of the invention may tune any of these parameters to optimize the formation and maintenance of the fluidized bed in the continuous elutriation cycles. For example, the parameters tuned may be one or more of rotation speed of the separation chamber, cell load volume, cell load flow rate, collection flow rate, collection volume, and/or time for fluidized bed formation. Tuning of the parameters takes into account attributes of the desired end product such as cell number yield, cell viability, and cell concentration and purity. In some embodiments, a prediction algorithm may be used to tune the parameters for optimizing the formation of the fluidized bed with the desired cells. The algorithm may include multivariate analysis of critical method parameters.

In some embodiments, the parameter(s) of the first elutriation cycle are tuned to optimize the formation of the fluidized bed of the first set of cells of interest within the separation chamber. The first set of cells of interest may be monocytes. Likewise, the parameter(s) of the second elutriation cycle may be tuned to optimize the collection of the cells of interest on the fluidized bed formed by the first set of desired cells in the separation chamber. The desired cells may be monocytes such that the parameter(s) of the second elutriation cycle are tuned to optimize the collection of the second set of monocytes on the fluidized bed formed by the first set of monocytes in the separation chamber. Further, the parameter(s) of the second elutriation cycle may be tuned so as to maintain the fluidized bed of the first set of cells of interests within a first portion of the separation chamber while further collecting the second set of cells of interest on the fluidized bed.

Optimization may be achieved by adjusting the rotation speed of the separation chamber from a first rotation speed associated with performing the first elutriation cycle to a second rotation speed associated with performing the second elutriation cycle that is different than the first rotation speed. In some embodiments, the rotation speed of the separation chamber is adjusted for each elutriation cycle so as to optimize the formation and maintenance of the fluidized bed and addition of cells to the fluidized bed for each cycle. For example, adjusting the rotation speed of the second elutriation cycle may result in movement of the fluidized bed with the first set of cells to a portion of the separation chamber such that space in the separation chamber is available for the addition of the second set of cells on the fluidized bed.

In some embodiments, adjusting the rotation speed of the second elutriation cycle results in movement of the fluidized bed with the first set of cells of interest to a portion of the separation chamber such that space in the separation chamber is available for the addition of the second set of cells of interest on the fluidized bed. As noted above, methods of the invention may include multiple elutriation cycles, including a final elutriation cycle. This final cycle may be performed with or without prior introduction of an associated cell load into the separation chamber.

In some embodiments, the first cell load and the second cell load may be introduced into the separation chamber within an associated fluid. For example, the first and/or second cell loads may be cells suspended within a buffer solution as described above. Optimization of the formation of the fluidized bed and/or the maintenance of the bed and further addition of cells to the bed may be achieved by tuning the flow of cells in the fluid to and through the separation chamber. The buffer flow rate control may be managed by an integrated or separate peristaltic pump.

As noted above, in some embodiments, the cells may be obtained from a leukapheresis product. For example, the cells may be a fresh or frozen product derived from leukapheresis bags. The continuous counterflow centrifugation elutriation methods of the invention may be used for any sample containing cells or cell products.

In some embodiments, methods of the invention may include a pre-processing step to prepare total nucleated cells (TNCs) for cell loading. The pre-processing step may include a lysis step. Cell lysis or cellular disruption breaks or damages the outer boundary or cell membrane. The outer boundary or cell membrane is broken down or destroyed in order to release intercellular materials such as DNA, RNA, protein or organelles from a cell. For example, red blood cells in the leukapheresis product may be lysed to give white blood cells only as the input for cell loading. Specifically, white blood cells may be separated from other blood products such as red blood cells, plasma, and platelets. The lysis step may be performed using methods known to persons skilled in the art, for example as described Ohta, 2017, A review of macroscale and microscale cell lysis methods, Micromachines, 8(3):83, 1-27, incorporated by reference herein. In other embodiments, the method includes loading the leukapheresis product or other cell-containing product without a lysis step. In some embodiments, red blood cells may be eliminated using ACK lysing buffer, for example as provided by Gibco™.

The lysis step may take place within the separation chamber of a counterflow or reverse flow centrifugation device. Cells may be loaded into the device as described above and subjected to counterflow centrifugation. During this process the lysis buffer may be introduced into the chamber to deplete red blood cells through the elutriation process. The cell bed may then be washed to stop the lysis and cells recovered in an intermediate bag for downstream processing by the methods of the invention.

In some embodiments, methods of the invention may include a washing step. Washing may include washing the aggregate of cells of interest collected within the separation chamber upon completion of all elutriation cycles. For example, the washing step may include washing the aggregate of monocytes collected within the separation chamber upon completion of all elutriation cycles. The wash buffer may include the presence of serum as buffering proteins to help avoid cell death due to hydrodynamic stress. For applications requiring serum-free buffers, hydroxyethyl starch and dextran 40 are examples of non-protein additives that may also be used to protect against hydrodynamic stress.

The wash step may include flowing buffer through the chamber to exchange medium that the cells are suspended in and to remove contaminants. Cells may then be flowed from the chamber into a harvest bag as part of a harvest step.

The method may also include a harvesting step in which the collected and/or enriched cells are harvested. Cells may be transferred to a cell harvest bag for further downstream processing. For example, monocytes collected may be washed with buffer as described above and transferred to a monocyte harvest bag or container. Harvesting may be automated using the operation of the counterflow centrifugation device. For example, after processing to accumulate particles suspended in a fluidized bed within the separation chamber, the flow direction may be reversed to initiate harvest according to stored and/or predefined instructions. For example, the recovered concentrated volume may be determined based on detection of the concentration of the leading and trailing edge of the fluidized bed and/or other control events programmable as part of the counterflow centrifugation device.

As noted above, the novel continuous elutriation methods of the present invention provide improved workflows for the separation and enrichment of cells for downstream processing. The invention provides for methods of collecting cells using a novel continuous elutriation process wherein multiple elutriation cycles are performed on a continuous flow of cells before harvesting. Methods of the invention optimize conditions and parameters for each elutriation cycle such that cells are maintained and added to the fluidized bed. As described in detail in the examples below, the methods of the invention provide for increased purity of cells collected, reduced processing time, reduced buffer use, and improved cell viability for downstream processing.

Figure 7A:
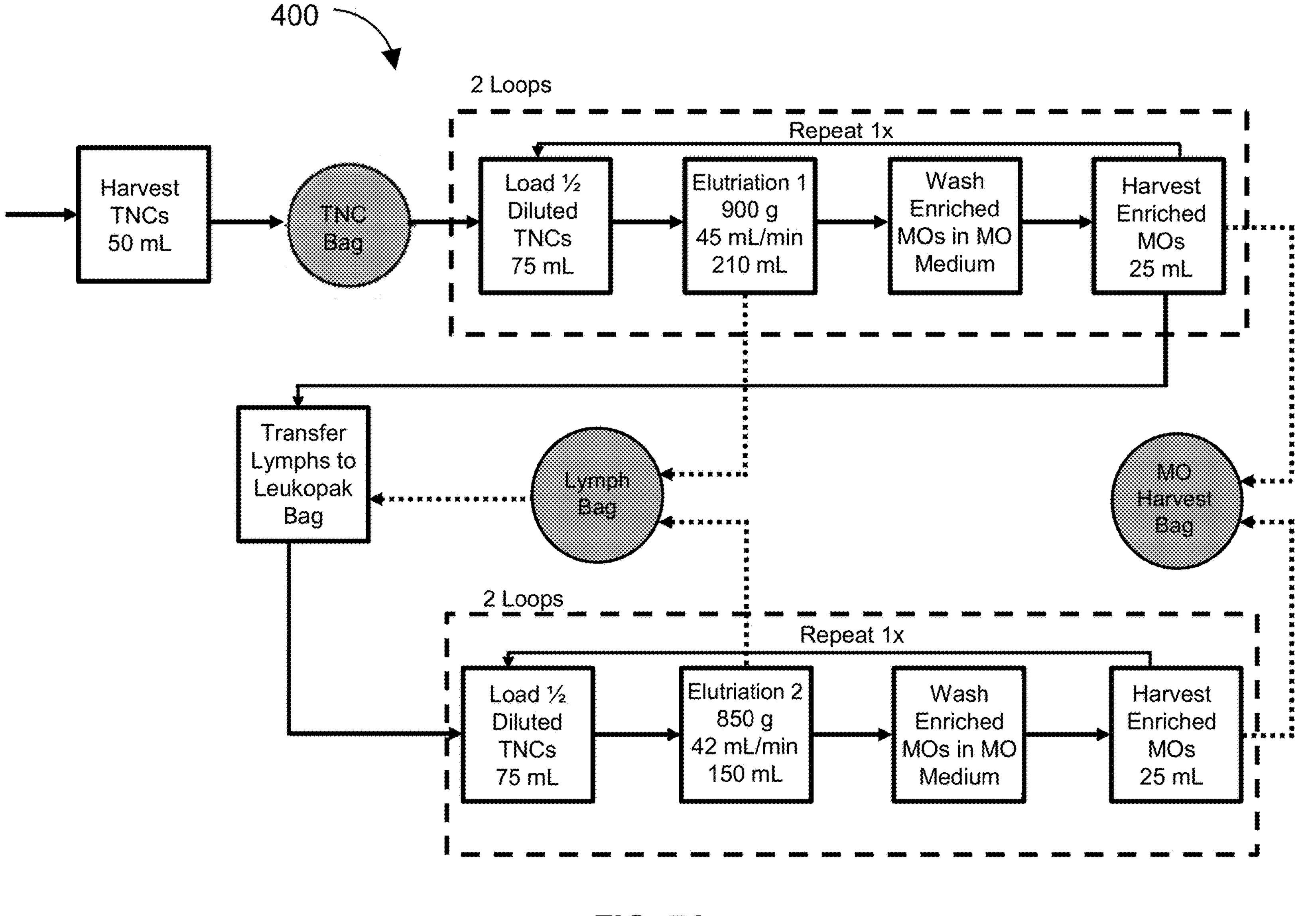
FIG. 7A diagrams a prior art approach using a batch elutriation workflow protocol for collecting monocytes.
Figure 7B:
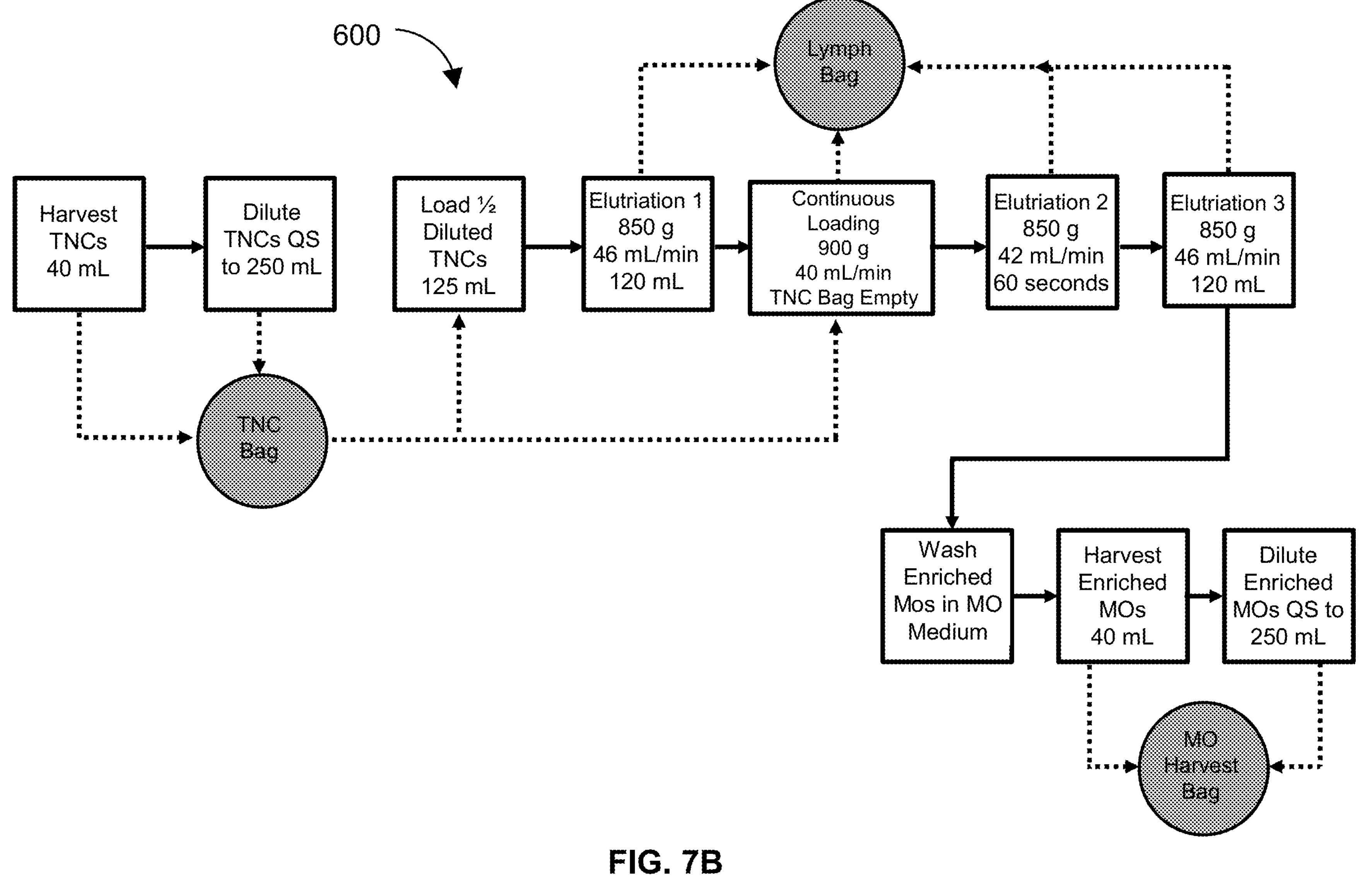
FIG. 7B diagrams a continuous elutriation workflow protocol of an embodiment of methods of the invention.

FIG. 7A illustrates the prior art approach using a batch elutriation protocol 400 versus the novel continuous elutriation protocol 600, illustrated in FIG. 7B, of the current invention.

EXAMPLES

A continuous elutriation process was developed and iterated upon to improve monocyte (MO) purity and MO retention during CFC elutriation. Results are summarized in Table 1 below.

1. 0419-04202022 data was collected using the original batch elutriation process as control with no improvements made based on the data.
2. 06142022 development of the continuous elutriation process results summarized below:
   - Continuous elutriation resulted in a higher MO purity while retaining sufficient MOs compared to the batch elutriation process.
   - The continuous elutriation process also reduced the volume of DPBS required and was faster than the batch elutriation process.
   - Leukapheresis loading and lysis was also iterated upon which resulted in reducing the number of leukapheresis loading loops from 3 to 2 which reduced the volume of ACK buffer and DPBS required along with reducing processing time.
3. 06282022: Same leukapheresis loading and lysis as 06242022. Same protocol scheme as 06242022 except that (i) Elutriate 1 volume increased from 120 mL to 150 mL and (ii) Elutriate 3 volume increased from 120 mL to 200 mL.
   - 2 loading loops, 2 min Lysis 3, and 3 loop Pause/Wash continues to work well.
   - Determine how MO Harvest and Elutriate composition changes when volume is increased.
   - All prior work was done with volume constant at 120 mL. 120 mL was selected as a reasonable start and worked well so was not changed.
   - Increasing volume resulted in more MOs being elutriated but no substantial improvement in MO purity.
   - Comparing to prior runs (with different leukapheresis donor caveat), increasing volume has negligible effect on purity and results in more MOs being elutriated.
   - Hypothesis that 120 mL will work best for all leukapheresis products so that too many MOs are not elutriated. Continue to use 120 mL volume for Elutriate 1 and Elutriate 3.
4. 07012022 Same protocol as 06242022 6-1. Same leukapheresis loading and lysis as 06242022 except that 3 loops were used because leukapheresis CoA indicated that leukapheresis contained ~20 billion TNCs compared to ~10 billion TNCs of a typical leukapheresis collection. Leukapheresis was atypical because it contained ~20 billion TNCs so 3 leukapheresis loading loops were used, otherwise the counterflow centrifugation (CFC) chamber would have overfilled.
   - Noted that at least 2 protocols for leukapheresis loading and lysis will be needed based on the number of TNCs in leukapheresis product.
     - 1 protocol with 2 loops and 1 protocol with 3 loops.
   - 3 loading loops, 2 min Lysis 3, and 3 loop Pause/Wash worked well.
   - This protocol and elutriation conditions appears to work very well for leukapheresis products tested and results in a relatively consistent MO purity between 50-80%.
   - 120 mL also takes less time and requires less DPBS and a smaller Lymphocyte bag, all positives compared to higher volumes used in 0628.
   - MO Harvest purity was 78% which was highest seen. Lymphocyte had substantial number of MOs.
   - This leukapheresis product was likely an outlier since the MO proportion of leukapheresis was higher than average and the TNCs in leukapheresis was nearly double than typical.

TABLE 1

| | Elutriate 1 | | | Continuous Loading | | | Elutriate 2 | | | Elutriate 3 | | |
|---|---|---|---|---|---|---|---|---|---|---|---|---|
| Protocol | Speed | Q | Volume | Speed | Q | Volume | Speed | Q | Time | Speed | Q | Volume |
| 06282022 | 850 g | 46 mL/min | 150 mL | 900 g | 40 mL/min | 110 mL | 850 g | 42 mL/min | 60 seconds | 850 g | 46 mL/min | 200 mL |
| 07012022 | 850 g | 46 mL/min | 120 mL | 900 g | 40 mL/min | 110 mL | 850 g | 42 mL/min | 60 seconds | 850 g | 46 mL/min | 120 mL |
| 07192022 | | | | | | | | | | | | |
| 07222022 | | | | | | | | | | | | |

Figure 8A:
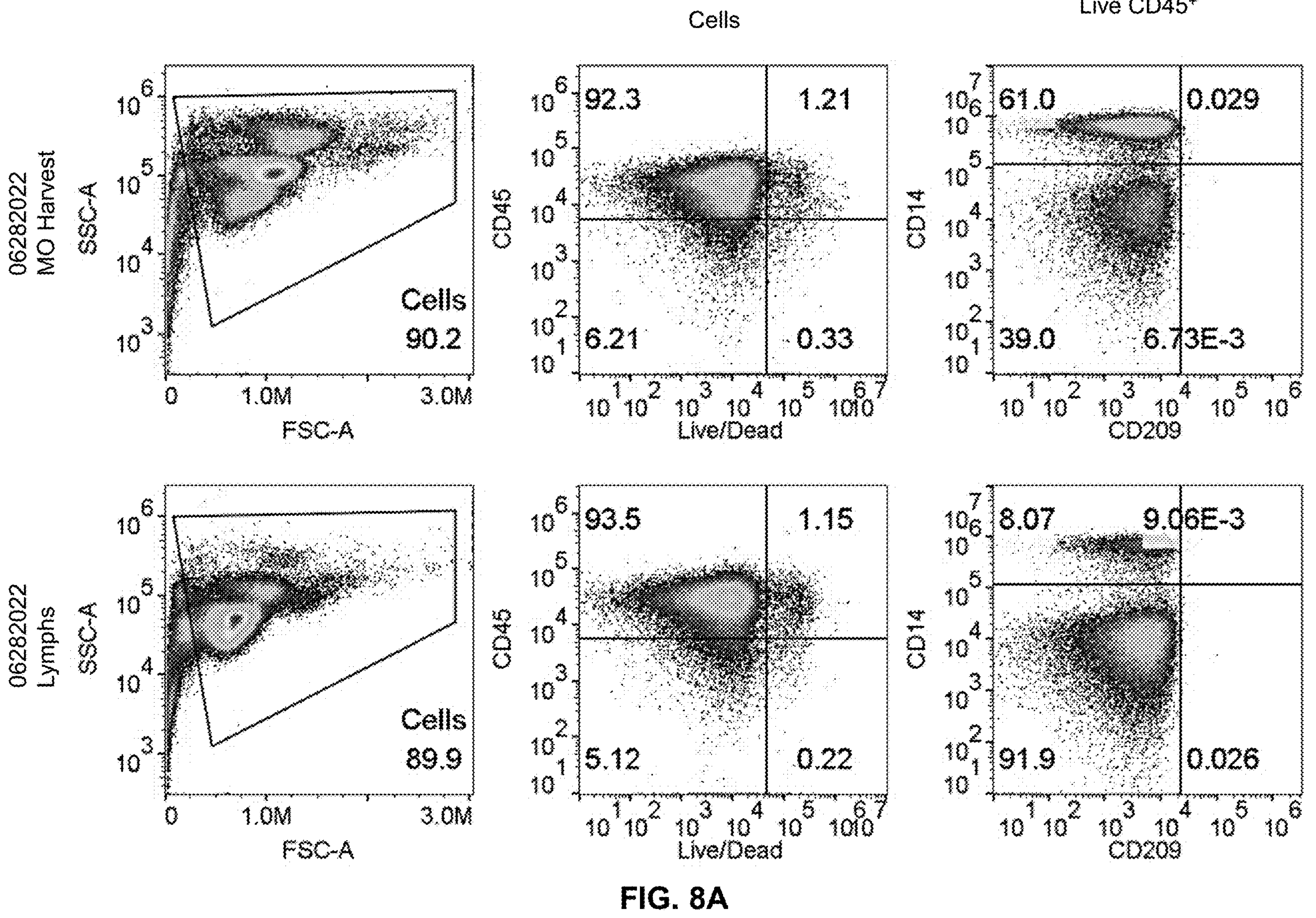
FIG. 8A and FIG. 8B illustrate results of monocytes harvested and lymphocytes collected using a protocol of methods of the invention.
Figure 8B:
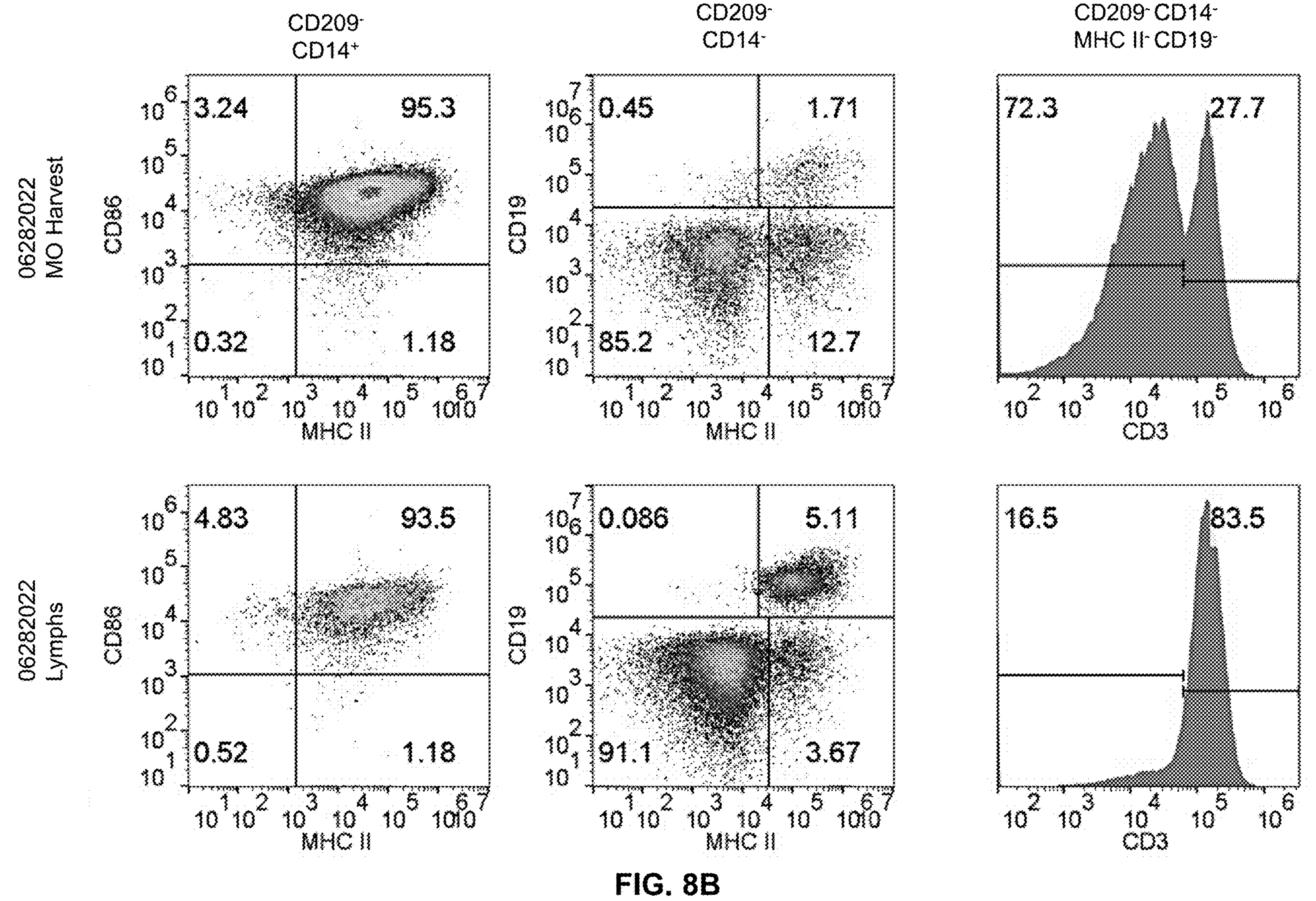

FIG. 8A and FIG. 8B illustrate results of monocytes harvested and lymphocytes collected using the 06282022 protocol of methods of the invention.

Figure 9A:
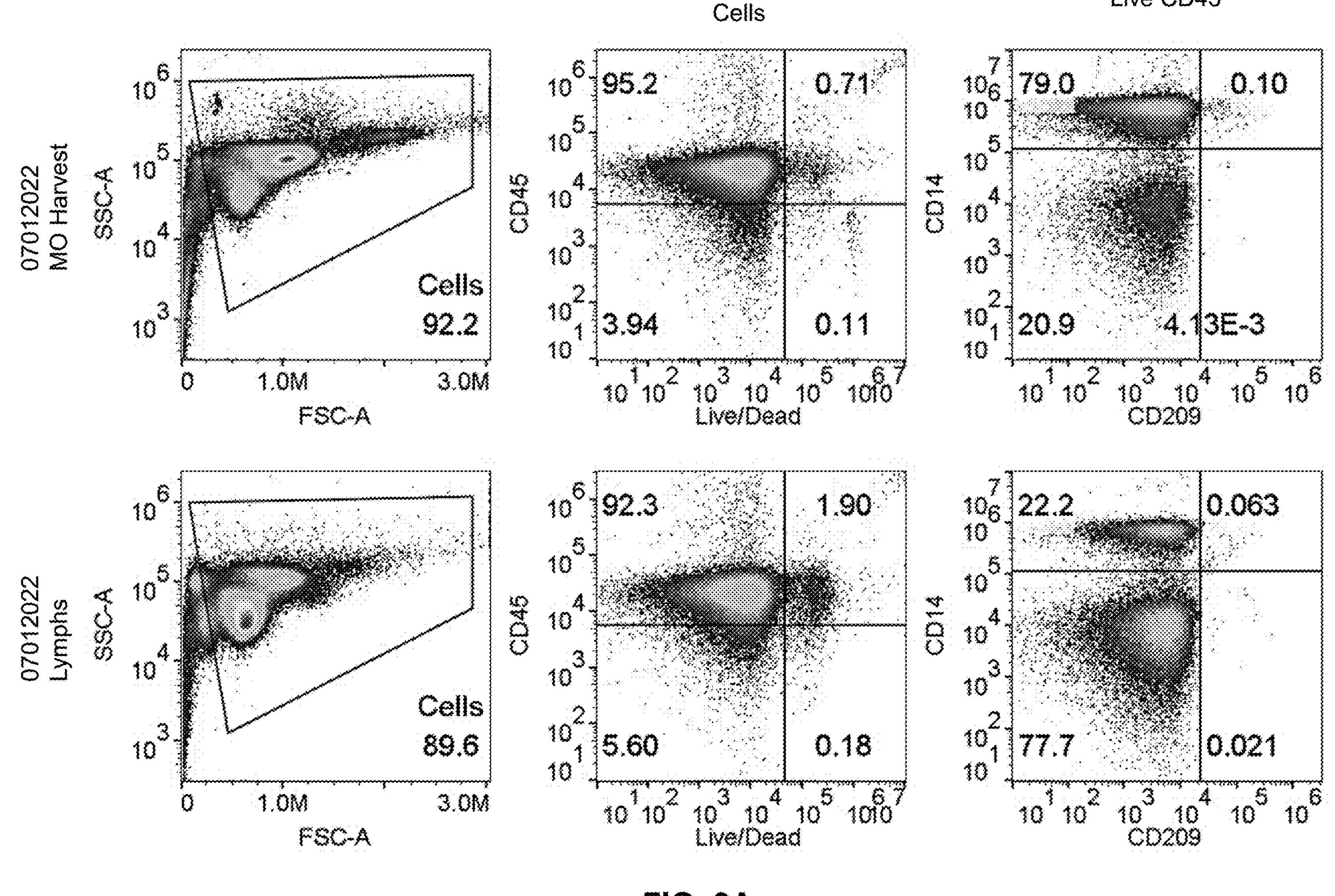
FIG. 9A and FIG. 9B illustrate results of monocytes harvested and lymphocytes collected using a protocol of methods of the invention.
Figure 9B:
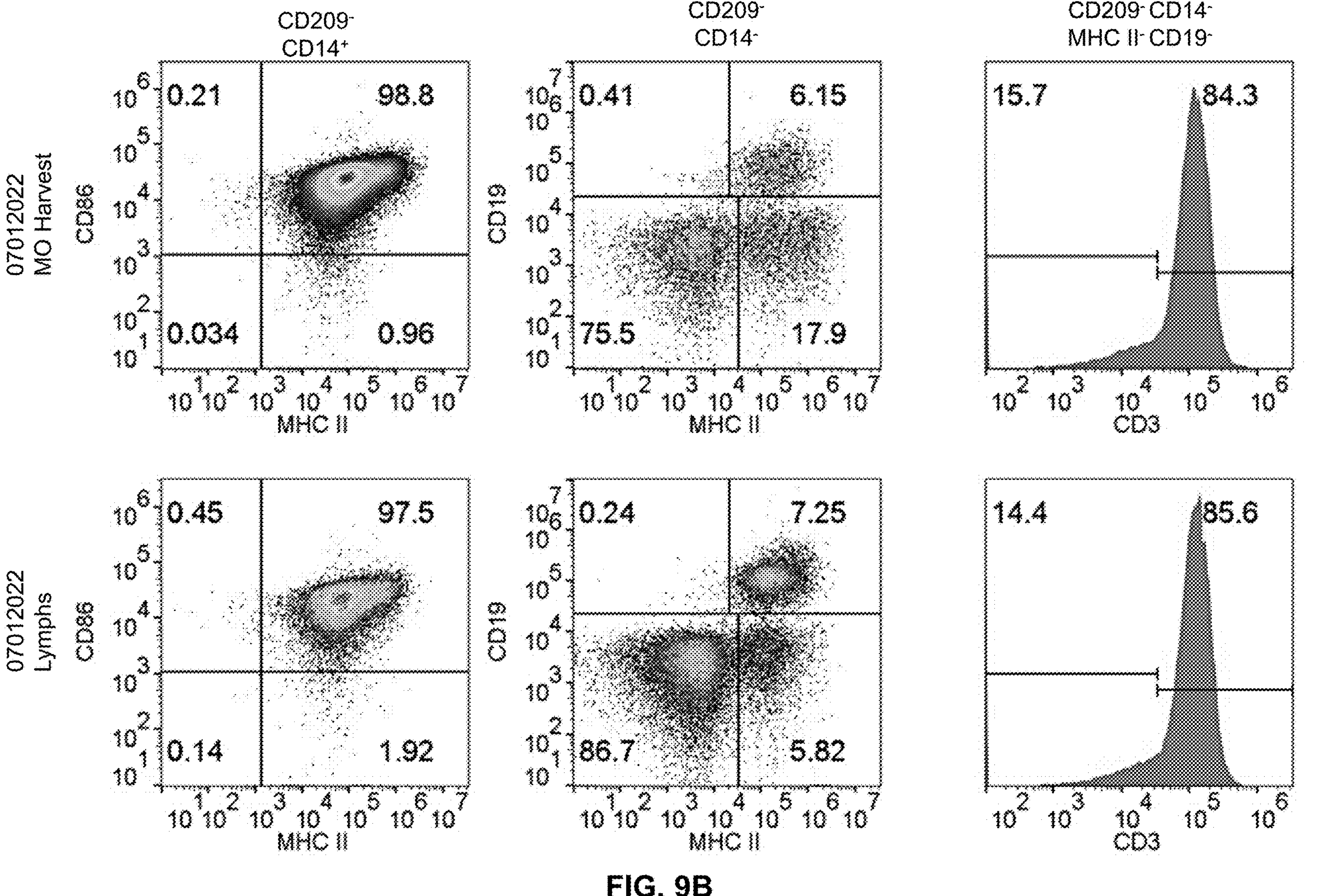

FIG. 9A and FIG. 9B illustrate results of monocytes harvested and lymphocytes collected using the 07122022 protocol of methods of the invention.

Figure 10A:
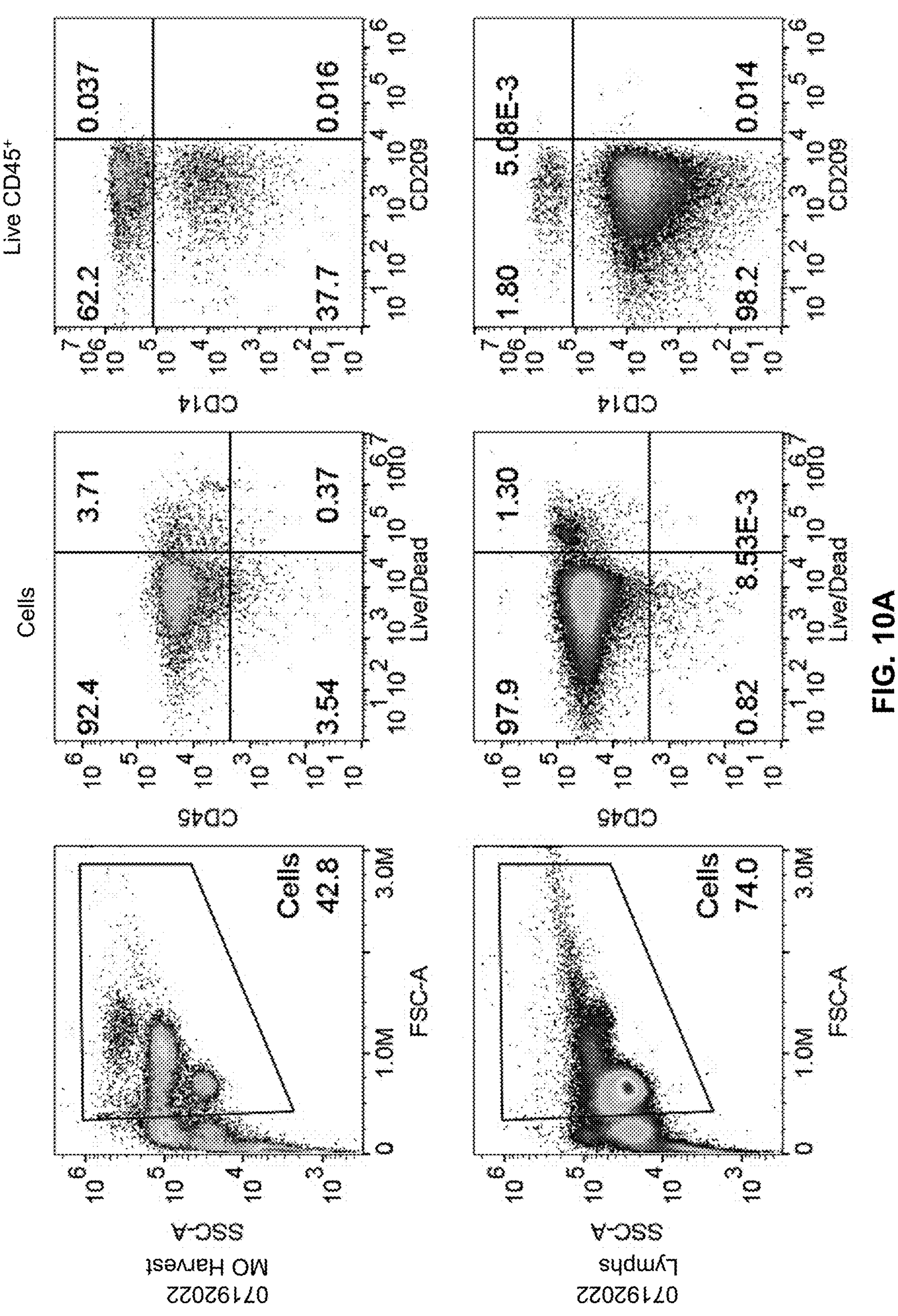
FIG. 10A and FIG. 10B illustrate results of monocytes harvested and lymphocytes collected using a protocol of methods of the invention.
Figure 10B:
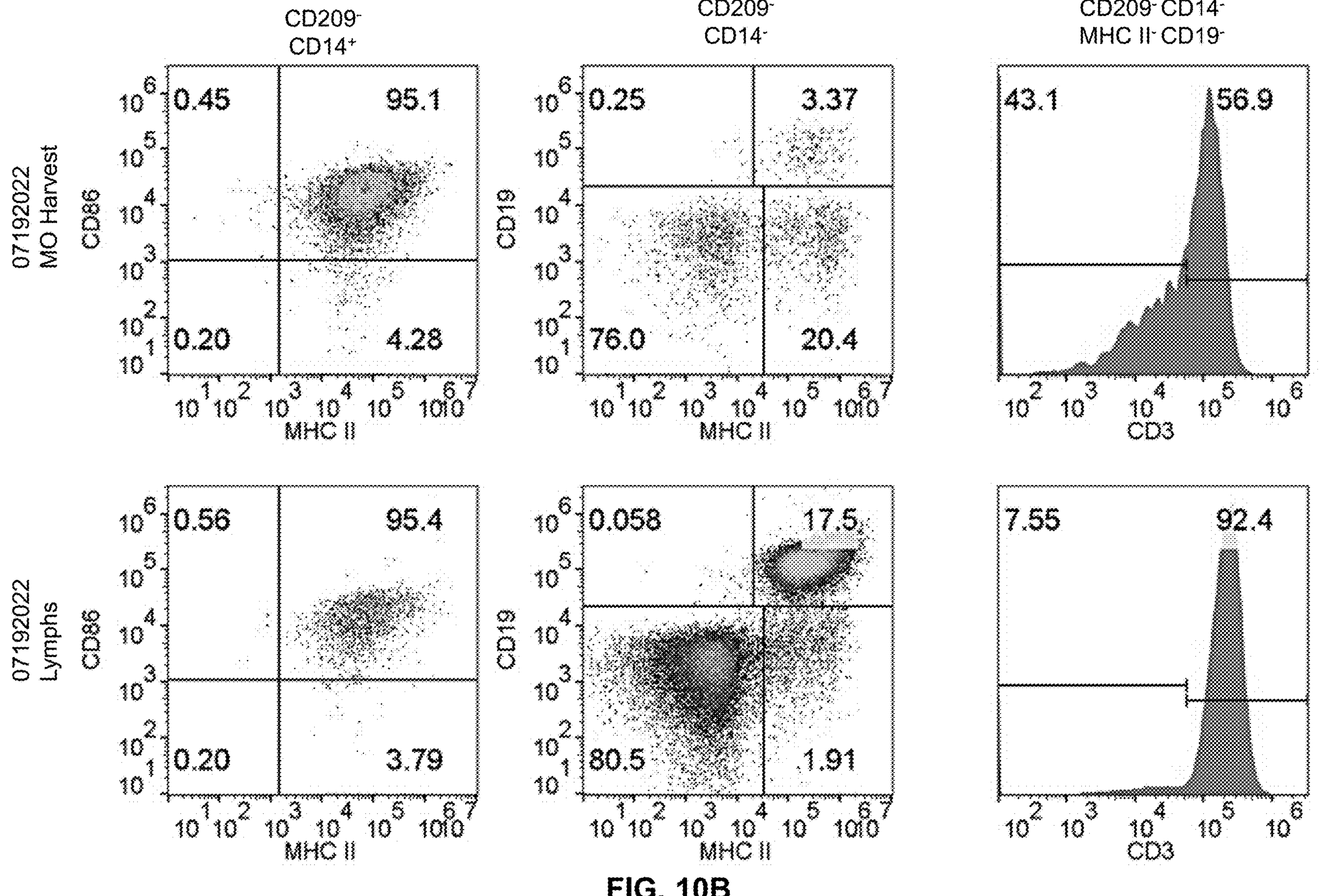

FIG. 10A and FIG. 10B illustrate results of monocytes harvested and lymphocytes collected using the 07192022 protocol of methods of the invention.

Figure 11A:
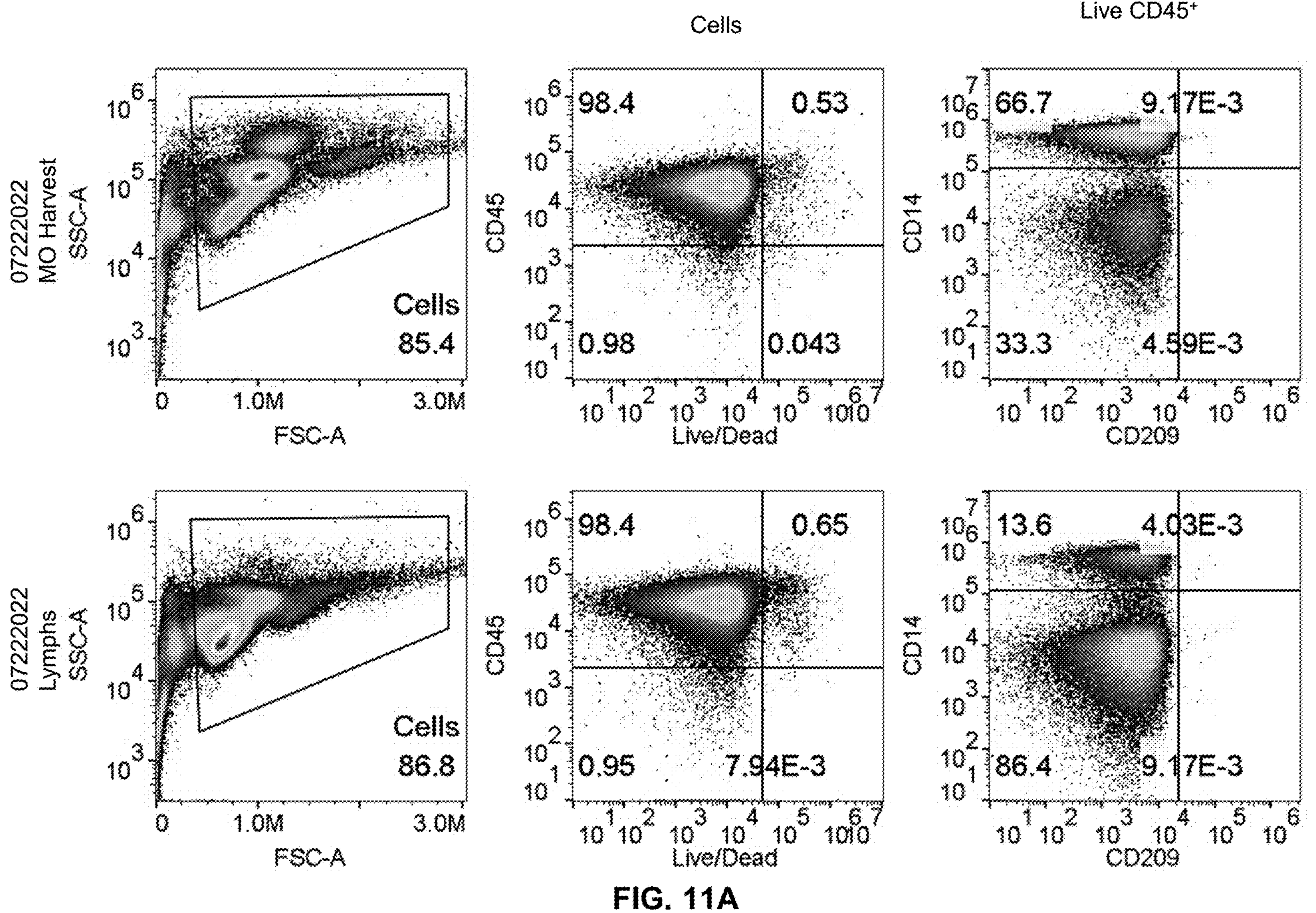
FIG. 11A and FIG. 11B illustrate results of monocytes harvested and lymphocytes collected using a protocol of methods of the invention.
Figure 11B:
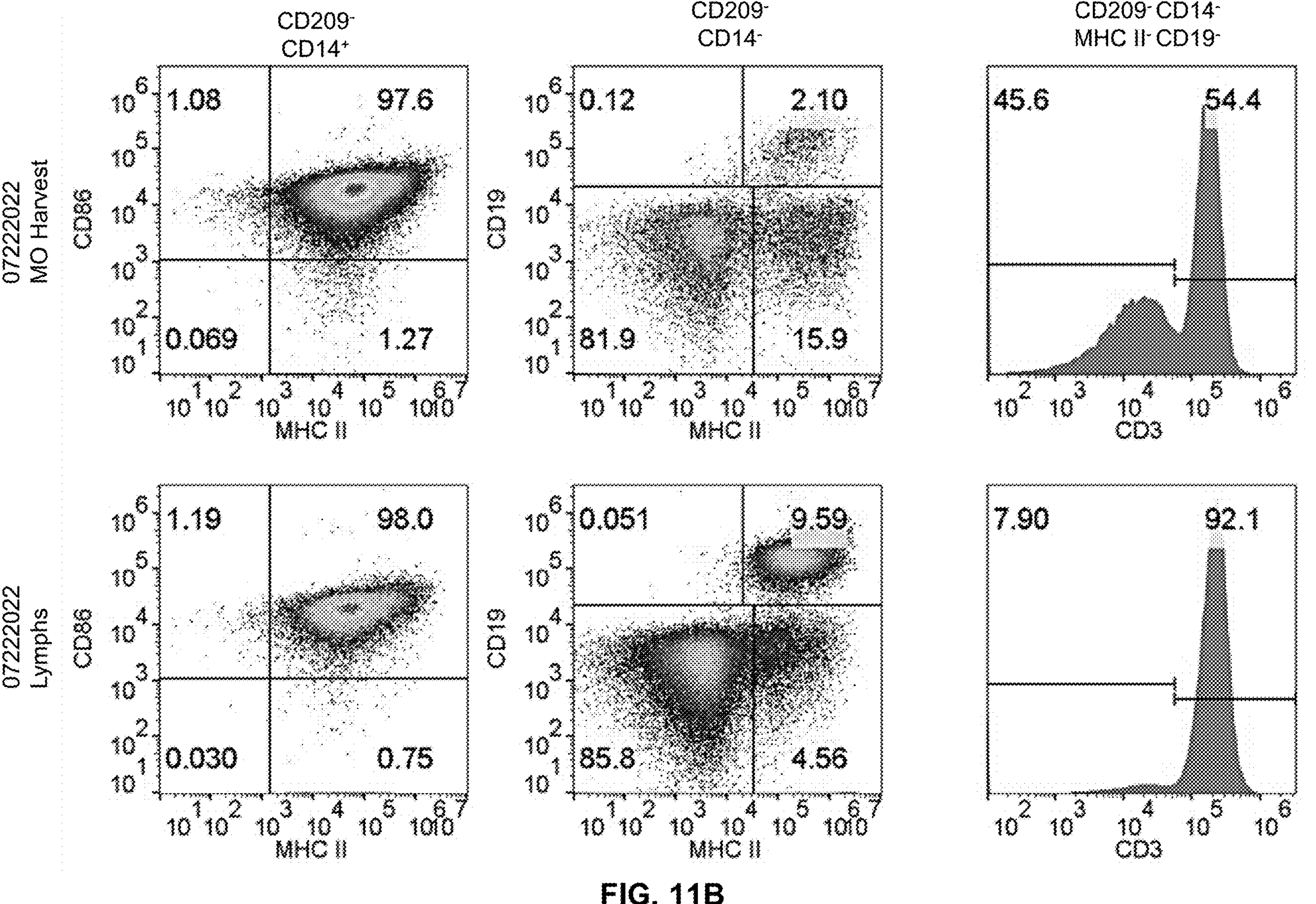

FIG. 11A and FIG. 11B illustrate results of monocytes harvested and lymphocytes collected using the 07222022 protocol of methods of the invention.

Data using the Continuous Elutriation Protocol of methods of the invention is summarized in Table 2 below:

TABLE 2

| | | Count (×10^6) | MO (×10^6) | MO Proportion | T cell (×10^6) | T cell Proportion |
|---|---|---|---|---|---|---|
| 06182022 | Leukopak | 8,514 | 1,533 | 18% | 6,066 | 71% |
| | 4-1 Elutriate | 5,611 | 173 | 3% | 4,823 | 86% |
| | 4-1 MO Harvest | 1,500 | 797 | 53% | 512 | 34% |
| 06212022 | Leukopak | 6,788 | 971 | 14% | 4,399 | 65% |
| | 5-1 Elutriate | 3,086 | 78 | 3% | 2,398 | 78% |
| | 5-1 MO Harvest | 1,061 | 654 | 62% | 232 | 22% |
| 06282022 | Elutriate | 5,067 | 434 | 9% | 3,603 | 71% |
| | MO Harvest | 1,444 | 879 | 61% | 132 | 9% |
| 07012022 | Elutriate | 9,434 | 2,028 | 22% | 5,547 | 59% |
| | MO Harvest | 1,255 | 981 | 78% | 176 | 14% |
| 07192022 | Elutriate | 5,073 | 86 | 2% | 3,615 | 71% |
| | MO Harvest | 2,365 | 1,439 | 61% | 443 | 19% |
| 07222022 | Elutriate | 5,266 | 666 | 13% | 3,647 | 69% |
| | MO Harvest | 1,129 | 765 | 68% | 160 | 14% |

CONCLUSIONS

1. Continue to use the 07012022 Elutriation protocol to determine how most leukapheresis products behave and if cell separation is consistent between leukapheresis products.
2. Continue to use improved leukapheresis loading & lysis protocol based on 06242022 protocol.
3. Use 07012022 protocol for leukapheresis with >15 billion TNCs so that CFC chamber does not overload

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A method for collecting cells, the method comprising:

introducing a first cell load into a rotatable separation chamber of a reverse flow centrifugation device, wherein the first cell load comprises a first set of cells of interest and a first set of one or more other cell types;

performing a first elutriation cycle on the first cell load to form a fluidized bed of the first set of cells of interest within the separation chamber while the first set of one or more other cell types are separated apart from the first set of cells of interest;

introducing into the separation chamber a second cell load while the first set of cells of interest remains within the separation chamber, wherein the second cell load comprises a second set of cells of interest and a second set of one or more other cell types; and performing a second elutriation cycle on the second cell load to collect the second set of cells of interest on the fluidized bed of the first set of cells of interest in the separation chamber while the second set of one or more other cell types are separated apart from the first and second sets of cells of interest.

2. The method of claim 1, wherein the first elutriation cycle and the second elutriation cycle are performed as a continuous elutriation process.

3. The method of claim 1, further comprising tuning one or more parameters of at least one of the first elutriation cycle or second elutriation cycle to optimize the formation of the fluidized bed of cells of interest and/or the collection of cells of interest on the fluidized bed within the separation chamber.

4. The method of claim 3, wherein the one or more parameters comprise at least one of a rotation speed of the separation chamber, a cell load volume, a cell load flow rate, and a time for fluidized bed formation.

5. The method of claim 4, wherein one or more parameters of the first elutriation cycle are tuned to optimize the formation of the fluidized bed of the first set of cells of interest within the separation chamber.

6. The method of claim 4, wherein one or more parameters of a second elutriation cycle are tuned to optimize the collection of the second set of cells of interest on the fluidized bed of the first set of cells of interest in the separation chamber.

7. The method of claim 6, wherein one or more parameters of the second elutriation cycle are tuned so as to maintain the fluidized bed of the first set of cells of interest within a first portion of the separation chamber while further collecting the second set of cells of interest on the fluidized bed.

8. The method of claim 7, wherein a rotation speed of the separation chamber is adjusted from a first rotation speed associated with performing the first elutriation cycle to a second rotation speed associated with performing the second elutriation cycle that is different than the first rotation speed.

9. The method of claim 8, wherein the second rotation speed results in movement of the fluidized bed of the first set of cells of interest to the first portion of the separation chamber such that a space in the separation chamber is available for collecting the second set of cells of interest on the fluidized bed.

10. The method of claim 1, further comprising performing a final elutriation cycle.

11. The method of claim 10, wherein the final elutriation cycle is performed without prior introduction of an associated cell load into the separation chamber.

12. The method of claim 1, wherein the first cell load and the second cell load are introduced into the separation chamber within an associated fluid.

13. The method of claim 12, wherein each of the first cell load and the second cell load comprise cells suspended within a buffer solution.

14. The method of claim 13, wherein the cells are obtained from an apheresis process.

15. The method of claim 1, further comprising washing an aggregate of cells of interest collected within the separation chamber upon completion of all elutriation cycles.

16. The method of claim 1, further comprising one or more additional elutriation cycles.

17. The method of claim 1, wherein the cells of interest are selected from the group consisting of red blood cells, neutrophils, eosinophils, basophils, monocytes, lymphocytes, and macrophages.

18. The method of claim 17, wherein the cells of interest are monocytes.

* * * * *